(12) United States Patent
Kunnath et al.

(10) Patent No.: US 11,513,499 B2
(45) Date of Patent: Nov. 29, 2022

(54) WEB BASED VIEWING OF ROBOTIC PROCESS AUTOMATION (RPA) PACKAGES AND WORKFLOWS

(71) Applicant: UiPath, Inc., New York, NY (US)

(72) Inventors: Liji Kunnath, Bangalore (IN); Arghya Chakrabarty, West Bengal (IN); Prashant Verma, Bangalore (IN); Abhishek Kumar, West Bengal (IN); Sunil Ajjampur Jagadeesh, Bangalore (IN)

(73) Assignee: UiPath, Inc., New York, NY (US)

( * ) Notice: Subject to any disclaimer, the term of this patent is extended or adjusted under 35 U.S.C. 154(b) by 136 days.

(21) Appl. No.: 17/068,734

(22) Filed: Oct. 12, 2020

(65) Prior Publication Data
US 2022/0066422 A1 Mar. 3, 2022

(30) Foreign Application Priority Data
Aug. 28, 2020 (IN) .............................. 202011037088

(51) Int. Cl.
*G06F 9/451* (2018.01)
*G06F 8/41* (2018.01)
(Continued)

(52) U.S. Cl.
CPC ........... *G05B 19/4155* (2013.01); *G06F 8/34* (2013.01); *G06F 9/451* (2018.02);
(Continued)

(58) Field of Classification Search
CPC ...... G05B 19/4155; G05B 2219/50391; G06F 9/451; G06F 9/45512; G06F 8/34; G06F 8/427; G06F 8/30; G06F 8/35; G06F 8/60
See application file for complete search history.

(56) References Cited

U.S. PATENT DOCUMENTS 7,958,486 B2 6/2011 Tsyganskiy et al.
9,594,544 B2 3/2017 Wang et al.
(Continued)

OTHER PUBLICATIONS

Niek Gosen, How Robotic Process Automation (RPA) Influences Firm Financial Performance in the Netherlands, 2019, [Retrieved on Oct. 3, 2022]. Retrieved from the internet: <URL: https://essay.utwente.nl/79600/1/Gosen_MA_BMS.pdf> 86 Pages (1-86) (Year: 2019).*

(Continued)

*Primary Examiner* — Anibal Rivera
(74) *Attorney, Agent, or Firm* — LeonardPatel PC; Sheetal S. Patel; Michael A. Leonard, II

(57) ABSTRACT

A system and a computer-implemented method for viewing at least one robotic process automation (RPA) workflow using a web based user interface are disclosed herein. The computer-implemented method includes accessing the web based user interface and identifying the at least one RPA workflow for viewing. The computer-implemented method further includes generating, using a workflow object model component, a workflow diagram for the identified at least one RPA workflow. The computer-implemented method further includes rendering, using a web based visualization engine component, the generated workflow diagram for the identified at least one RPA workflow and displaying the rendered workflow diagram for viewing of the at least one RPA workflow on the web based user interface.

27 Claims, 17 Drawing Sheets

(51) Int. Cl.
  *G05B 19/4155* (2006.01)
  *G06F 8/34* (2018.01)
  *G06F 8/60* (2018.01)
  *G06F 8/35* (2018.01)
  *G06F 9/455* (2018.01)
  *G06F 8/30* (2018.01)

(52) U.S. Cl.
  CPC ...... *G05B 2219/50391* (2013.01); *G06F 8/30* (2013.01); *G06F 8/35* (2013.01); *G06F 8/427* (2013.01); *G06F 8/60* (2013.01); *G06F 9/45512* (2013.01)

(56) References Cited

U.S. PATENT DOCUMENTS

| | | | |
|---|---|---|---|
| 10,545,755 | B2 | 1/2020 | Garay et al. |
| 10,635,407 | B2 | 4/2020 | Gorenshtein |
| 2013/0152041 | A1 | 6/2013 | Hatfield et al. |
| 2018/0074931 | A1 | 3/2018 | Garcia et al. |
| 2018/0197123 | A1 | 7/2018 | Parimelazhagan et al. |
| 2018/0217999 | A1 | 8/2018 | Kona et al. |
| 2019/0050776 | A1 | 2/2019 | Chen et al. |
| 2020/0180155 | A1 | 6/2020 | Hall |
| 2020/0206920 | A1* | 7/2020 | Ma ............ G06Q 10/0633 |
| 2020/0401431 | A1* | 12/2020 | Rashid ............ G06F 9/451 |
| 2021/0286597 | A1* | 9/2021 | Thangaraj ............ G06F 8/30 |
| 2021/0304064 | A1* | 9/2021 | Mudi ............ G06N 3/008 |

OTHER PUBLICATIONS

ISR & WO issued Dec. 13, 2021, PCT Application No. PCT/US21/47399.

Automation Anywhere, "Comparing files that reside on the client and server", May 5, 2020, retrieved from the internet at https://docs.automationanywhere.com/bundle/enterprise-v11.3/page/enterprise/topics/aae-client/bot-creator/getting-started-with-aa/comparing-files-that-reside-on-the-client-and-server.html.

Oracle, "Comparing Different Versions of a Workflow Process or Task UI", 2013, retrieved from the internet at https://docs.oracle.com/cd/E14004_01/books/UsingTools/customizing_objects13.html.

* cited by examiner

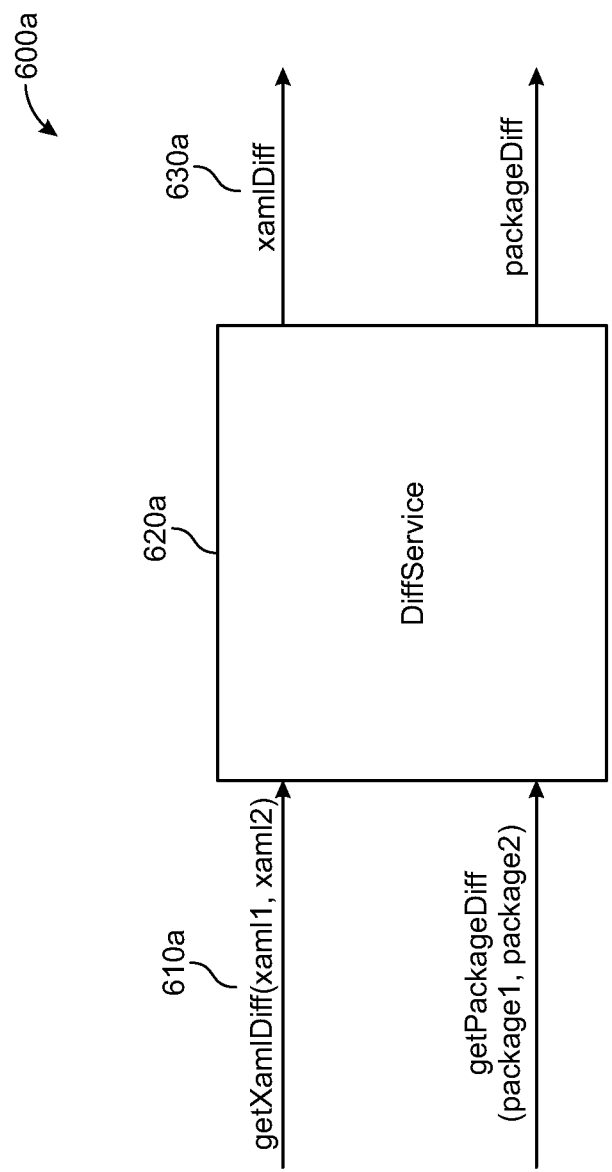

WEB BASED VIEWING OF ROBOTIC PROCESS AUTOMATION (RPA) PACKAGES AND WORKFLOWS

CROSS-REFERENCE TO RELATED APPLICATION

This application claims the benefit of Indian Patent Application No. 202011037088 filed Aug. 28, 2020. The subject matter of this earlier filed application is hereby incorporated by reference in its entirety.

FIELD

The present invention generally relates to robotic process automation (RPA), and more specifically, to exploration of RPA packages and RPA workflows.

BACKGROUND

RPA has been used to facilitate the proliferation of software automation due to its execution of relatively simple, repeatable tasks that exist in large numbers within an enterprise. RPA generally allows automation of simple tasks that were earlier done using manual user input to a computing system, and are now being increasingly performed by software robots using RPA tools. Currently, RPA tools are available which may help a software developer to design, execute, deploy and test the simple tasks and repeated tasks of the enterprise. For example, these tasks may be designed using designer tools and deployed using deployment tools. There may be several designer tools to design workflows for the simple tasks and repeated tasks in an RPA application. These designer tools are used for development of RPA workflows.

However, there is a need for alternatives to designer tools, that can be used for accessing RPA workflows and any RPA package and workflow file for that matter.

SUMMARY

Certain embodiments of the present invention provide better and easy solutions to the problems and needs in the art that have not yet been fully identified, appreciated, or solved by current RPA technologies. For example, some embodiments of the present invention pertain to exploring and comparing packages and workflows using a web based user interface.

In an embodiment, a computer-implemented method is provided. The computer-implemented method employs at least one hardware processor for executing a series of operations, wherein the series of operations are used for viewing at least one robotic process automation (RPA) workflow on a web based user interface. The series of operations include identifying the at least one RPA workflow for viewing on the web based user interface. The series of operations further include generating a workflow diagram for the identified at least one RPA workflow using a workflow object model component. The generated workflow diagram is rendered using a web based visualization engine component and displayed on the web based user interface for viewing of the at least one RPA workflow.

In yet another embodiment a system is provided. The system comprises a memory configured to store computer-executable instructions and one or more processors configured to execute the instructions. The computer-executable instructions are configured to cause the one or more processors to enable viewing at least one robotic process automation (RPA) workflow on a web based user interface. The computer-executable instructions are further configured to cause the one or more processors to identify the at least one RPA workflow for viewing on the web based user interface and generate a workflow diagram for the identified at least one RPA workflow using a workflow object model component. The generated workflow diagram is rendered using a web based visualization engine component and displayed on the web based user interface for viewing of the at least one RPA workflow.

In yet another embodiment, a computer program is embodied on a non-transitory computer-readable medium. The program is configured to store computer executable instructions which when executed by one or more processors cause the one or more processors to carry out operations for viewing at least one robotic process automation (RPA) workflow on a web based user interface. The operations include identifying the at least one RPA workflow for viewing on the web based user interface. The operations further include generating a workflow diagram for the identified at least one RPA workflow using a workflow object model component. The generated workflow diagram is rendered using a web based visualization engine component and displayed on the web based user interface for viewing of the at least one RPA workflow.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 6A-6E are graphical user interfaces (GUIs) illustrating web based user interfaces for visual representation of RPA packages and RPA workflows, according to an embodiment of the present invention.

DETAILED DESCRIPTION OF THE EMBODIMENTS

Some embodiments pertain to a system (herein after referred to be a computing system) configured to provide functionalities to view and to compare, at least one RPA workflow, at least two RPA package versions, at least two RPA workflows, or a combination thereof, using a web based user interface. For instance, the computing system displays a list of RPA packages and compares the selected RPA packages and also compares selected RPA workflows using a web based user interface. In an embodiment, the methods and systems are configured to have improved execution time and easy access for a user or a developer. In a conventional method, workflow developers or users need to review workflow packages and created workflows by navigating back to an integrated development environment before implementation whereas in the present invention the developers can review packages and workflows being published from the integrated development environment, such as UiPath Studio® through package and/or workflow comparison from a web based interface without requiring access to UiPath Studio®. Further, the improvements in execution time, storage requirements reduce computational overhead on the computing system. Some embodiments provide simple and easy access to the developer or user. In this way, the comparison of RPA packages and/or comparison of RPA workflows is achieved using the computing system and the computer-implemented method disclosed herein.

Figure 1:
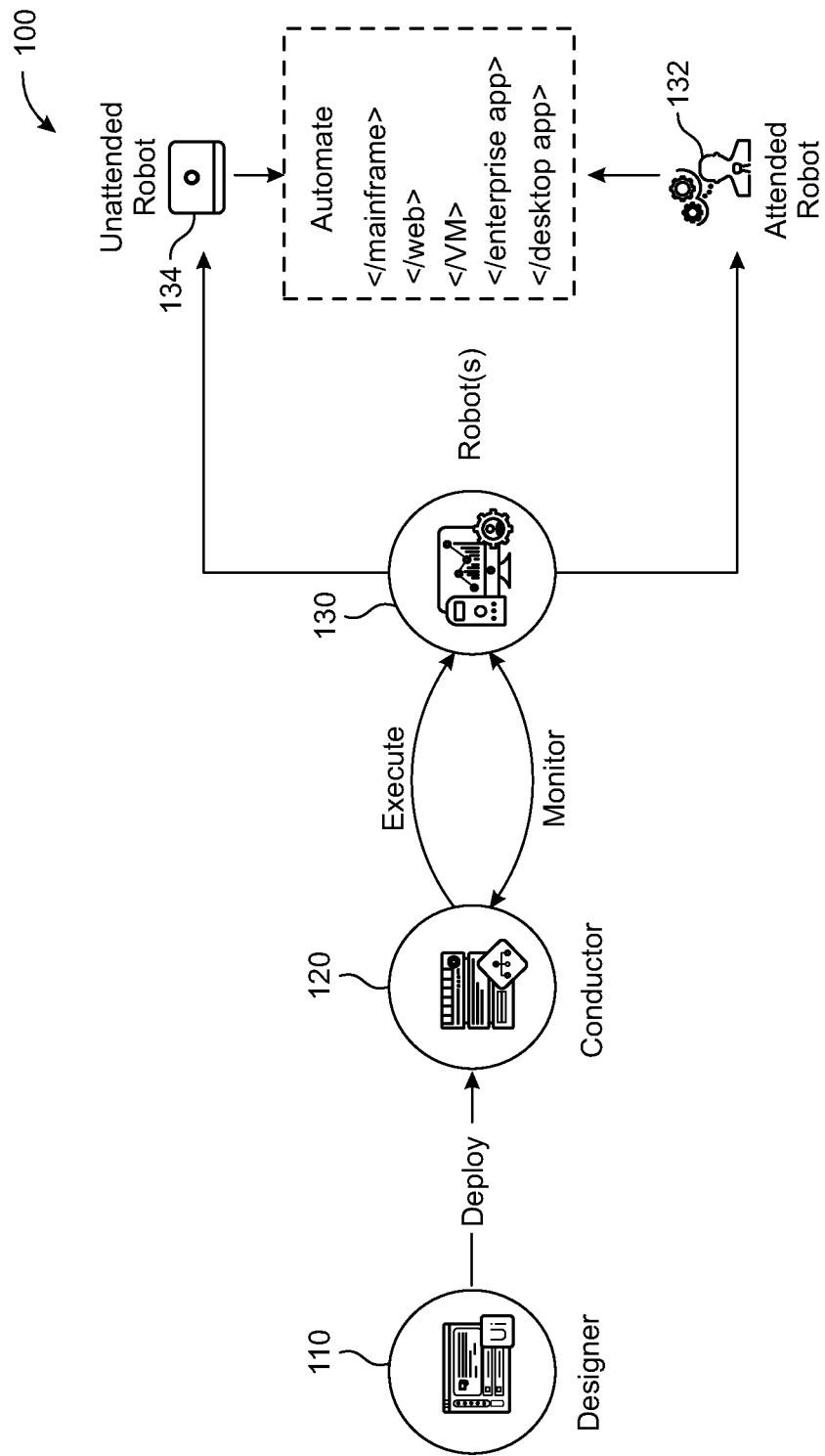
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer or a user to design and implement workflows. Designer 110 provides a solution for application integration, as well as automating third-party applications, administrative Information Technology (IT) tasks, and business IT processes. Designer 110 further facilitates development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity includes an action, such as clicking a button, reading a file, writing to a log panel, etc. In some embodiments, workflows can be nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 acts as an integration point with third-party solutions and applications. In an embodiment, conductor 120 is integrated with the web based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). The attended robots 132 are triggered by user events and operate alongside a human on the same computing system. The attended robots 132 are used with conductor 120 for a centralized process deployment and logging medium. Attended robots 132 help a human user accomplish various tasks, and are triggered by the user events. In some embodiments, processes are not started from conductor 120 on this type of robot and/or they do not run under a locked screen. In certain embodiments, attended robots 132 are started from a robot tray or from a command prompt. Attended robots 132 run under human supervision in some embodiments.

The unattended robots 134 run unattended in virtual environments and automate many processes. Unattended robots 134 are responsible for remote execution, monitoring, scheduling, and providing support for work queues. Debugging for all robot types is run in designer 110 in some embodiments. Both attended robots 132 and unattended robots 134 automate various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

The conductor 120 has various capabilities including, but not limited to, provisioning, deployment, configuration, queueing, monitoring, logging, and/or providing interconnectivity. Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch®, which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™. In some embodiments, robots 130 install the Microsoft Windows® Service Control Manager (SCM)-managed service by default. As a result, robots 130 can open interactive Windows® sessions under the local system account, and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically launched if the SCM-managed robot service is not installed.

Executors run given jobs under a Windows' session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
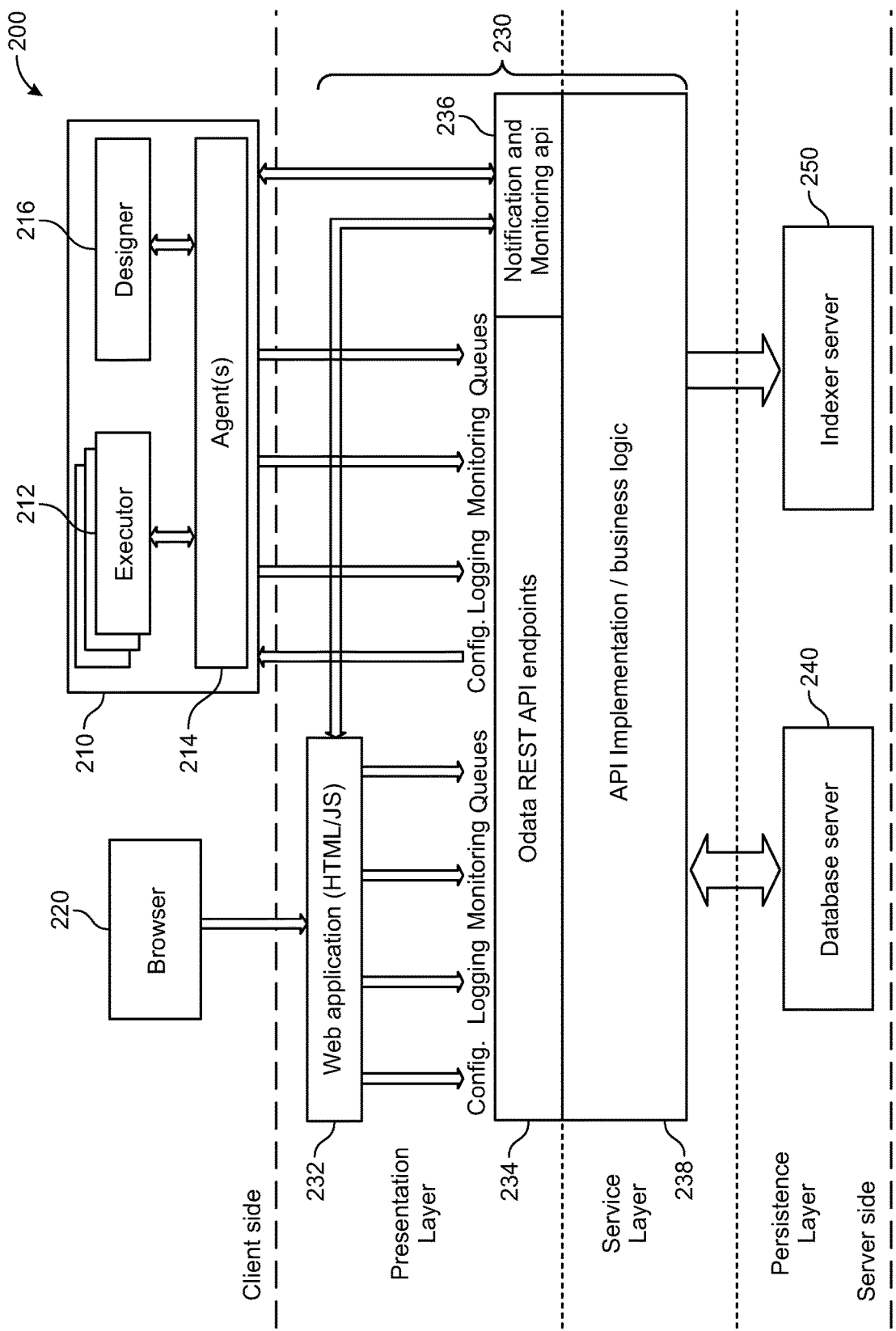
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, the designer 216 is not running on the robot application 210. The executors 212 are running processes. Several business projects (i.e. executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG. 1, executors 212 are robot components.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent 214. The notification and monitoring API 236 also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open source project full-text search engine. The messages logged by robots (e.g., using activities like log message or write line) are sent through the logging REST endpoint(s) to indexer server 250, where they are indexed for future utilization.

Figure 3:
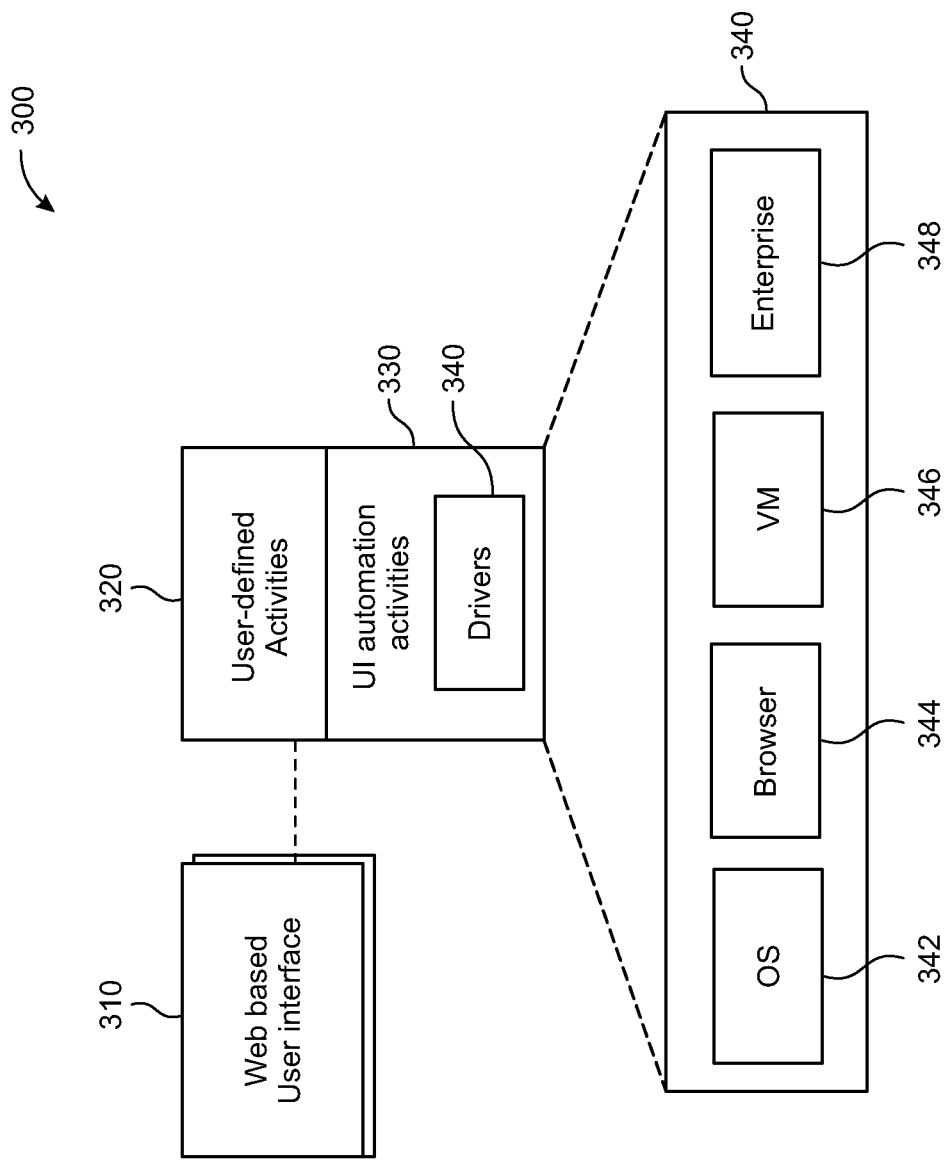
FIG. 3 is an architectural diagram illustrating the relationship between a designer, activities, and drivers, according to an embodiment of the present invention.

FIG. 3 is an architectural diagram illustrating a relationship 300 between a web based user interface 310, user-defined activities 320, User Interface (UI) automation activities 330, and drivers 340, according to an embodiment of the present invention. Per the above, a developer uses web based user interface 310 to access RPA workflows and RPA packages for viewing, exploration, comparison, and modification. According to some embodiments, web based user interface 310 is a desktop application which can be launched to access the RPA packages and RPA workflows. In some embodiments, the web based user interface is accessed by typing a URL of a web portal or a web site that redirects a user, such as the developer to the login page of a web portal which is used for accessing the RPA packages and RPA workflows.

In some alternate embodiments, the web based user interface is a part of a design module of an integrated development environment (IDE), which allows the user or the developer to perform one or more functionalities related to the workflows. The functionalities include editing, coding, debugging, browsing, saving, modifying and the like for the workflows. Further, in some embodiments, web based user interface 310 is configured to compare at least two RPA packages, and/or at least two RPA workflows such as in a multi-window user interface, such as a web based multi-window user interface. The workflows include user-defined activities 320 and UI automation activities 330. Some embodiments are able to identify non-textual visual components in an image associated with the workflows, which is called computer vision (CV) herein. Some CV activities pertaining to such components may include, but are not limited to, click, type, get text, hover, element exists, refresh scope, highlight, etc. The click in some embodiments identifies an element using CV, optical character recognition (OCR), fuzzy text matching, and multi-anchor, for example, and clicks it. The type identifies an element using the above and types in the element. The get text identifies the location of specific text and scan it using the OCR. The hover identifies an element and hover over it. The element exists checks whether an element exists on the screen using the techniques described above. In some embodiments, there may be hundreds or even thousands of activities that may be implemented in user defined activities 320 component. However, any number and/or type of activities may be available without deviating from the scope of the invention.

UI automation activities 330 are be a subset of special, lower level activities that are written in lower level code (e.g., CV activities) and facilitate interactions with the screen. In some embodiments, UI automation activities 330 include activities, which are related to debugging flaws or correcting flaws in the workflows. UI automation activities 330 facilitate these interactions via the drivers 340 that allow the robot to interact with the desired software. For instance, the drivers 340 include Operating System (OS) drivers 342, browser drivers 344, VM drivers 346, enterprise application drivers 348, etc.

The drivers 340 are configured to interact with the OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. The browser drivers 344 include a web-based user interface for a user or developer to interact. For example, web based user interface 310 may be a part of browser drivers 344 in some embodiments.

Figure 4:
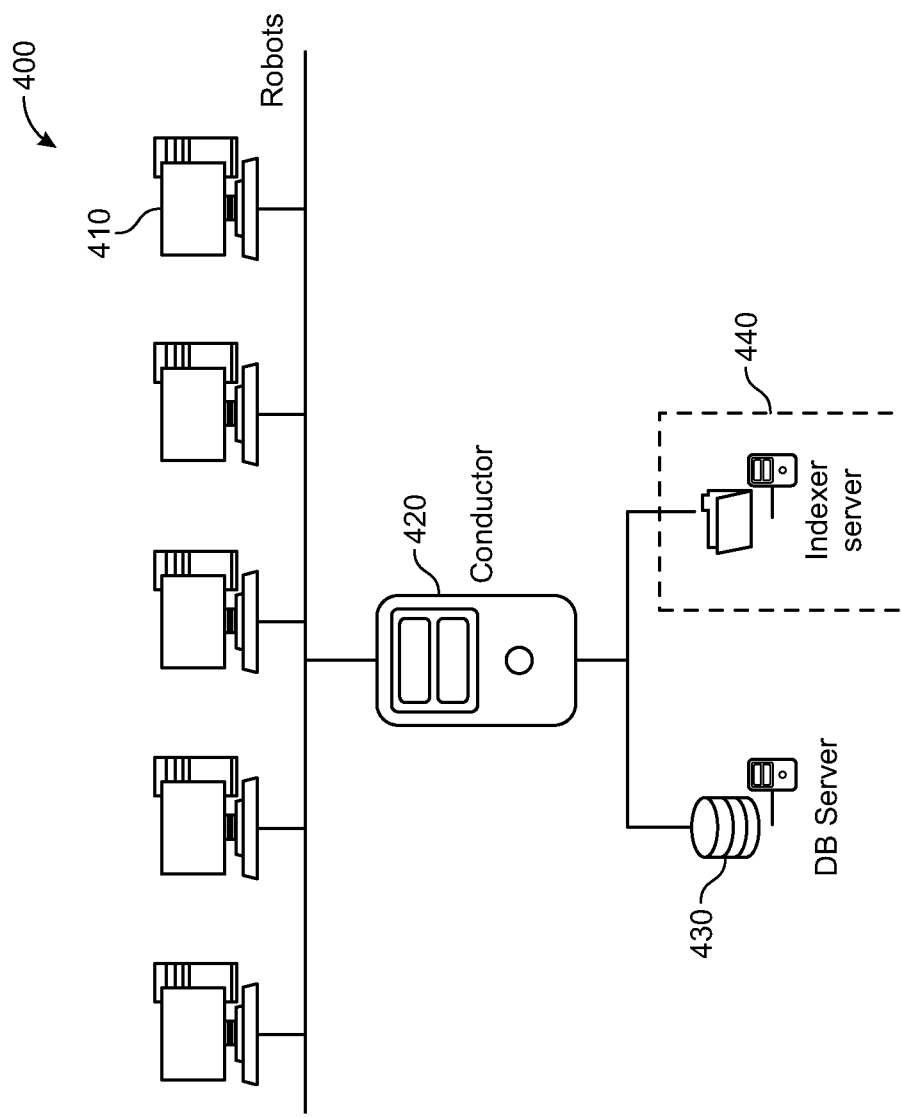
FIG. 4 is an architectural diagram illustrating another RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). In some embodiments, multiple client computing systems 410 are configured to compare the multiple RPA packages and RPA workflows. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems.

Figure 5:
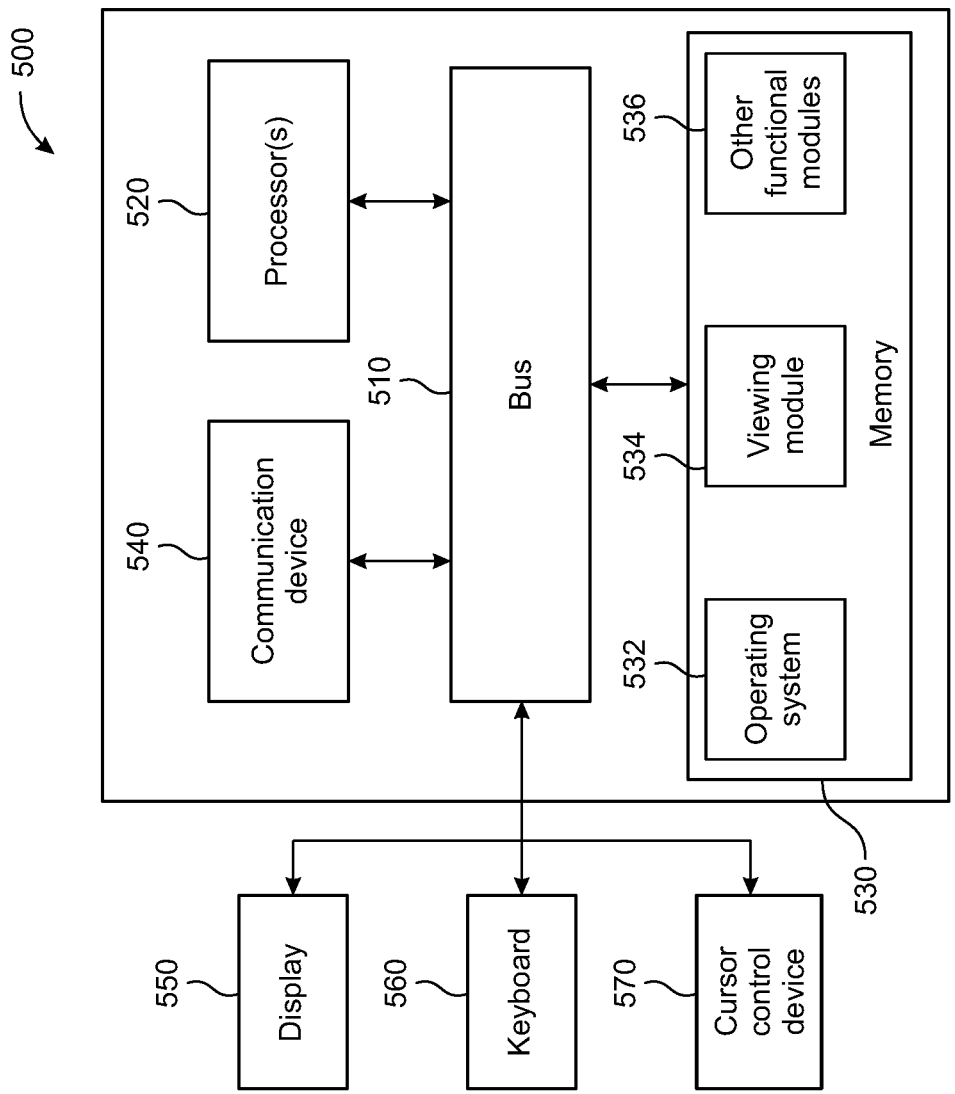
FIG. 5 is an architectural diagram illustrating a computing system configured for exploring and comparing RPA packages and RPA workflows using a web based user interface, according to an embodiment of the present invention.

FIG. 5 is an architectural diagram illustrating a computing system 500 configured to explore and compare RPA packages and/or RPA workflows using a web based user interface, according to an embodiment of the present invention. In some embodiments, computing system 500 may be one or more of the computing systems depicted and/or described herein. Computing system 500 includes a bus 510 or other communication mechanism for communicating information, and processor(s) 520 coupled to bus 510 for processing information. Processor(s) 520 could be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 520 may also have multiple processing cores, and at least some of the cores may be configured to perform specific functions. Multi-parallel processing is used in some embodiments. In certain embodiments, at least one of the processor(s) 520 can be a neuromorphic circuit that includes processing elements that mimic biological neurons. In some embodiments, neuromorphic circuits do not require the typical components of a Von Neumann computing architecture.

Computing system 500 further includes a memory 530 for storing information and instructions to be executed by the processor(s) 520. Memory 530 may be comprised of any combination of Random Access Memory (RAM), Read Only Memory (ROM), flash memory, cache, static storage such as a magnetic or optical disk, or any other types of non-transitory computer-readable media or combinations thereof. The non-transitory computer-readable media may be any available media that may be accessed by processor(s) 520 and may include volatile media, non-volatile media, or both. The media may also be removable, non-removable, or both.

Additionally, computing system 500 includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beam steering, a combination thereof, and or any other antenna configuration without deviating from the scope of the invention.

Processor(s) 520 are further coupled via bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. The display 550 is configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 560 and a cursor control device 570, such as a computer mouse, a touchpad, etc., are further coupled to bus 510 to enable a user to interface with computing system. However, in certain embodiments, a physical keyboard and mouse are not present, and the user interacts with the device solely through display 550 and/or a touchpad (not shown). Any type and combination of input devices may be used as a matter of design choice. In certain embodiments, no physical input device and/or display is present. For instance, the user interacts with computing system 500 remotely via another computing system in communication therewith, or the computing system 500 may operate autonomously.

Memory 530 stores software modules that provide functionality when executed by processor(s) 520. The modules include an operating system 532 for computing system 500. The modules further include a viewing module 534 that is configured to perform all or part of the processes described herein or derivatives thereof for providing visualization of one or more RPA packages or RPA workflows on a web based user interface, such as web based user interface 310. Furthermore, viewing module 534 includes a comparison module that is configured to compare at least two RPA workflow files (for instance, two or more .xaml files) and/or to at least two RPA packages. Computing system 500 may include one or more additional functional modules 536 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network. FIGS. 6A-6E illustrate exemplary functionalities of web based user interfaces for visualization, representation, comparison, accessing, exploration or accessing of RPA packages and workflows. according to various embodiments of the present invention.

FIG. 6A illustrates an exemplary block diagram of web based user interface 600a for package and workflow viewing and comparison, according to various embodiments of the present invention. Web based user interface 600a is associated with an input stream 610a, an output stream 630a and a viewing and differentiating service 620a. Input stream 610a is used to provide one or more input data types for viewing, exploring or analysis to the viewing and differentiating service 620a. The input data types can include workflows or packages. When the input data type is a workflow, input stream 610a includes one or more .xaml files, also interchangeably referred to as workflow files hereinafter, such as which can be obtained using a getxaml (xaml1, xaml2) function from one or more APIs stored in service layer 238. The workflow files can be obtained from an RPA document repository or from an RPA system, such as computing system 500, in some embodiments. In some alternate embodiments, the workflow files are obtained from the server side disclosed in FIG. 2, such as from database server 240. Input stream 610a may also include one or more packages retrieved from computing system 500. The one or more packages may be obtained using, for example, a getPackageDiff(package 1, package 2) function defined in one or more predefined APIs associated with RPA system 200 and stored in service layer 238. The data included in input stream 610a is provided to viewing and differentiating service 620a which performs one of the two operations: generating a visualization for viewing the contents of input stream 610a or generating a visualization for differentiating the contents of input stream 610a. For example, when only one workflow or one package is included in input stream 610a, viewing and differentiating service 620a generates a visualization for the contents of the workflow or the package in input stream 610a. But when two workflows or two packages are included in input stream 610a, viewing and differentiating service 620a generates a visual representation of differences between the two workflows or two packages included in input stream 610a.

In some embodiments, the differences are generated in response to a compare operation invoked on web based user interface 600a. Based on the generated visualization, output stream 630a renders the visualization of the contents of input stream 610a or renders the visualization of differences between two workflows or two packages included in input stream 610a. The rendered visualization is then displayed, such as on display 550 associated with computing system 500.

Figure 6B:
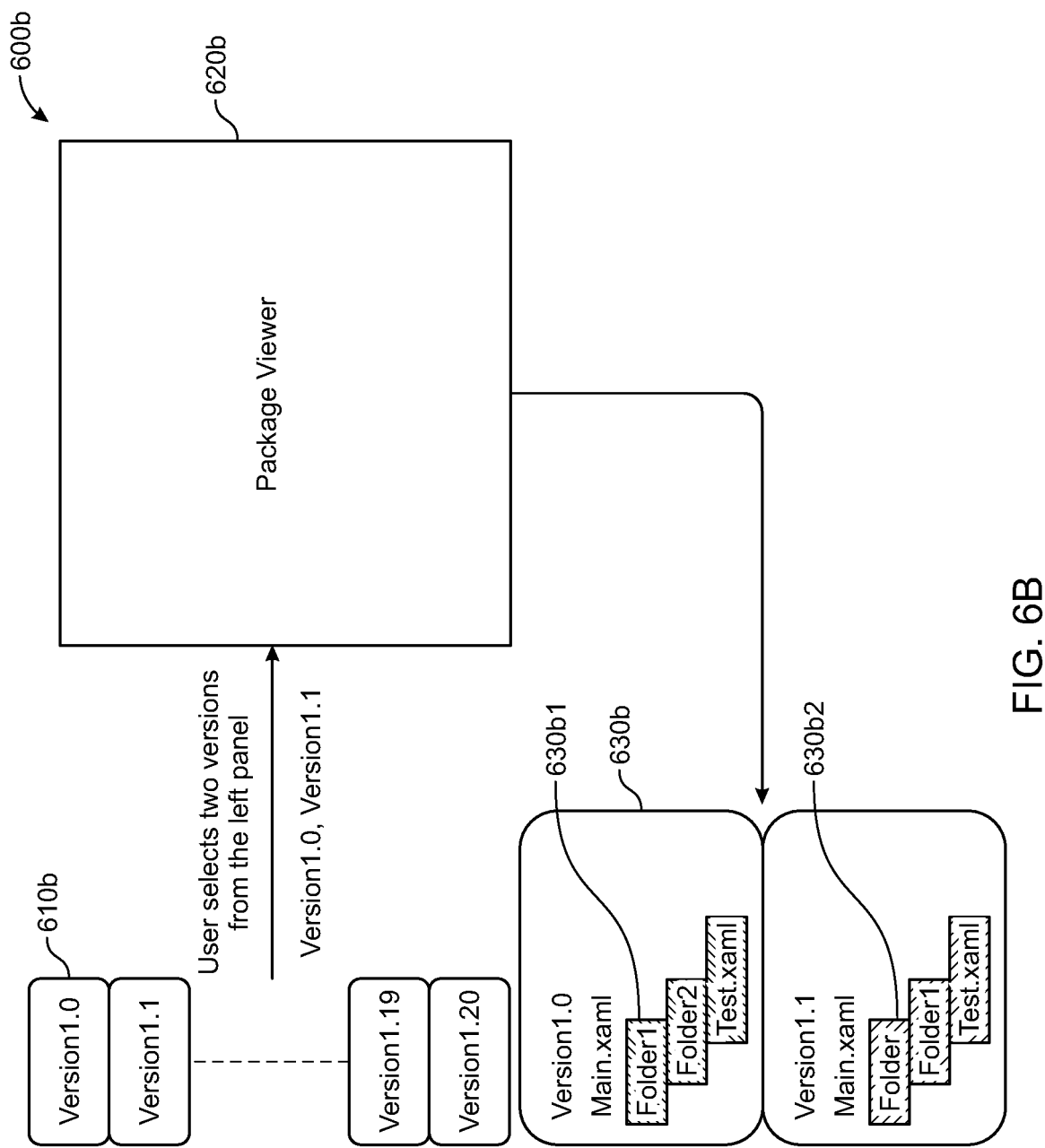

FIG. 6B illustrates an exemplary functionality of a package viewing or package explorer functionality provided by a web based user interface 600b in accordance with some exemplary embodiments. Web based user interface 600b is used to provide the functionality to explore one or more RPA packages 610b. For this, a package viewer component 620b is used. The output provided by package viewer component 620b is rendered using a visual representation 630b of the contents of the one or more RPA packages 610b. In some embodiments, visual representation 630b of the contents of one or more RPA packages 610b is provided on a display component associated with web based user interface 600b. For example, display unit 550 of computing system 500 can be used to view visual representation 630b of the contents of one or more RPA packages 610b, by using package viewer component 620b.

In some embodiments, package viewer component 620b is accessed by using web based user interface 600b, such as when a user logs into computing system 500 and accesses a browser application. Computing system 500 includes a plurality of RPA packages and RPA workflows which may be stored in memory unit 530 of computing system 500. Each user may be identified by computing system 500 based on their role, access privileges, type etc., which are determined based on their login credentials. In some embodiments, the user is associated with user context information, and this user context information is further used to present the list of one or more RPA packages 610b to the user. The different RPA packages in the list of one or more RPA packages 610b are each associated with a unique version number field and also an identification (ID) information.

Computing system 500 allows the user to view the list of one or more RPA package versions (for instance version 1.0, version 1.1 . . . version 1.20) on web based user interface 600b. The user selects at least two RPA package versions (for instance version 1.0 and version 1.1) from the list of the RPA package versions. On selecting any two RPA package versions, computing system 500 accesses package viewer component 620b. Package viewer component 620b may be embodied as a component of viewing module 534 of computing system 500. However, in some embodiments, package viewer component 620b is implemented as a standalone component with standalone processing units. Package viewer component 620b retrieves and displays the files (for instance .xaml files), and sub folders for both the RPA package versions on web based interface 600b. In an example embodiment, web based user interface 600b is also referred to as the package viewer. Each RPA package in the list of one or more RPA packages is associated with a unique identifier (ID) and each ID comprises a package name and the version number field. Further, each RPA package contains associated content which includes information about package dependencies, package files, package author and package description. Web based user interface 600b enables viewing of all the package associated content, on selecting a specific version of the package. Thus, when a package is selected from the displayed list of one or more RPA packages 610b corresponding to different version numbers, and a user clicks on a particular package version to select it, web based user interface 600b generates visual representation 630b of package contents including:

1. Dependencies (with package name as ID)—modified if version number or strictness is changed
    a. Version number b. IsStrictVersion
2. File items (path+isDirectory as ID)
   a. Directories—can be added, deleted or unmodified. Directories are never modified (since no modifiable property is available)
      I. File items
   b. Files with text content—modified if content is modified
3. Author
4. Description When the user selects a single RPA package version for viewing its contents, only contents of that selected RPA package are displayed. But, when the user selects two RPA package versions, the user can view and compare contents of the two RPA packages. For example, after selecting the two RPA package versions, the user selects an option to "compare" the two package versions provided on web based user interface 600b to visualize the differences between the selected two RPA packages. Further, web based user interface 600b is configured to provide visual representation 630b of the contents and differences between the selected two RPA packages using different colors, such as a first color 630b1 and a second color 630b2, in some embodiments. To that end, computing system 500 is configured to provide summary of the differences between the two RPA packages on web based user interface 600b. In some embodiments, these two RPA package versions are the input to computing system 500. Computing system 500 may execute viewing module 534 to generate visual representation 630b of the differences as shown on web based user interface 600b. For example, in visual representation 630b of the differences between the contents of the two selected RPA packages, different colors (e.g., first color 630b1 and second color 603b2) are used to show different files/folders added, deleted or modified. The version 1.0 of the RPA package contains some files and folders, which have been deleted and are thus shown in a first color (e.g., red) 630b1. The version 1.1 of the RPA package shows the files and folders, which have been added in the version 1.1 with respect to the package version 1.0, and are shown in a second color (e.g., green) 630b2. It may be understood by a person of ordinary skill in the art that the representation of differences between the two package versions by the different colors/patterns shown in FIG. 6B is only for exemplary purpose, and is in no way meant to limit the scope of the present invention.

In some embodiments, for calculating the summary of differences, viewing module 534 further comprises a comparison module that individually checks each package for modifications. In an embodiment, the comparison module compares the dependencies of the RPA packages. The different RPA package versions are considered as modified when the version number field associated with the RPA package is changed or if strictness is changed in the dependencies. In another embodiment, the comparison module also compares the file items of the RPA packages. The file items include directories and file with text content. The RPA package versions are considered as modified when something is deleted or added in the directory. Similarly, the RPA package versions are considered as modified when some text content in the file is modified. In some embodiments, viewing module 534 provides functionalities for viewing and comparing RPA workflows.

Figure 6C:
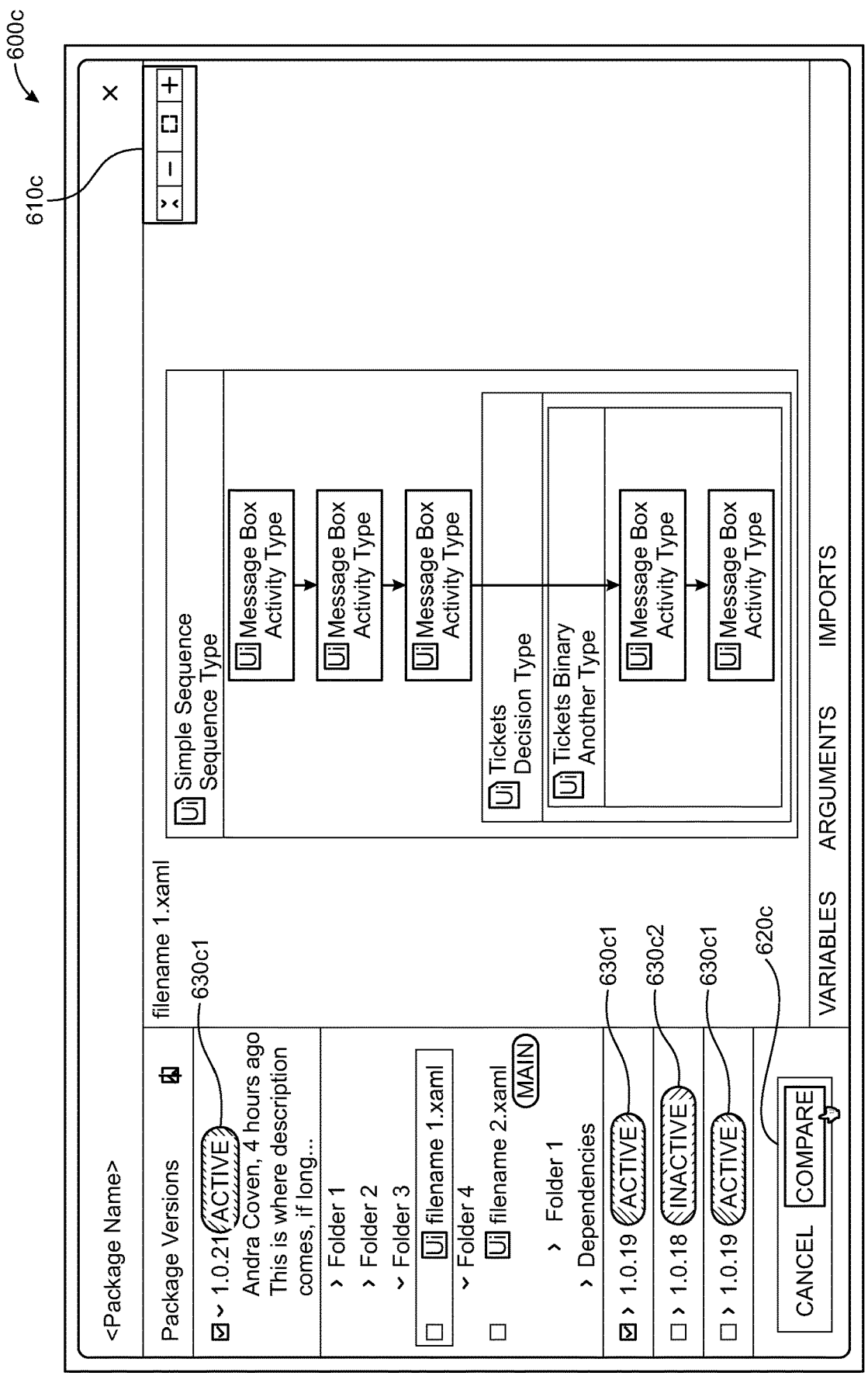

FIG. 6C illustrates an example of a functionality of web based user interface 600c for providing workflow comparison capability. Web based user interface 600c illustrates two workflows (that is to say .xaml files), a filename1.xaml workflow and a filename2.xaml workflow which belong to the same version of a package, a version 1.0.21. In this embodiment, user selects one RPA workflow to view its associated workflow diagram. For example, when the user accesses web based user interface 600c, such as using a browser on his or her computing system 500, and are presented with different package versions, the user selects the filename1.xaml workflow from package version 1.0.21. In the illustrated example, the filename1.xaml is a simple sequence type workflow. Thus, a workflow object model component (which will be discussed in detail in conjunction with FIG. 7) parses the filename1.xaml workflow, and generates a workflow diagram for the simple sequence filename1.xaml workflow. The workflow diagram is then rendered on web based user interface 600c by a web based visualization engine component (which will be discussed in detail in conjunction with FIG. 7). In this way, the contents of the filename1.xaml RPA workflow, which are in the form of sequence of activities are viewed on web based user interface 600c. In some other embodiments, the identified RPA workflow is in a more complex form, such as in the form of an FSM. In that case, the workflow diagram for that identified workflow represents a more complex relationship between different activities of the workflow in the form of a graph or a visual model. Thus, the visualization of the workflow diagram on the web based user interface provided by various embodiments of the present invention, such as web based user interface 600c, provides a simple and intuitive way to view complex RPA workflows. Additionally, the workflow and package viewing capabilities discussed herein can be accessed using a web based user interface without requiring large storage and processing requirements. This proves to be technically advantageous over existing solutions in the art, which require large storage and processing capabilities to be present in the system in order to generate visual representation of contents of an RPA package or an RPA workflow and that visual representation is also not intuitive and clear. Further, in most of these known solutions, a complete RPA software suite does need to be installed, such as at least both of UiPath® Studio™ and UiPath® Orchestrator™ may need to be installed to access any RPA package or RPA workflow. However, some embodiments provide a lightweight web based user interface (such as web based user interface 600c), which is used to view and compare different RPA packages and RPA workflows, without needing to install heavy weight components like UiPath® Studio™ and UiPath® Orchestrator™. Web based user interface 600c also provides a compare button 620c, which when clicked or pressed, allows comparison of any two (or more) selected RPA packages or RPA workflows, and shows differences between different RPA package versions in different colors/patterns (e.g., a first color 630c1 and a second color 630c2). Additions to package are shown in first color (e.g., green color) 630c1 and deletions are shown in a second color (red color) 630c2. Further, web based user interface 600c also provides one or more navigation controls 610c, which are used to navigate within the visual representation of the identified RPA workflow or RPA package. In some embodiments, navigation controls 610c enable the user to navigate in a non-linear manner, such as not strictly in top to bottom order, among the various activities displayed in the rendered visual representation of the workflow diagram associated with the selected RPA workflow.

Figure 6D:
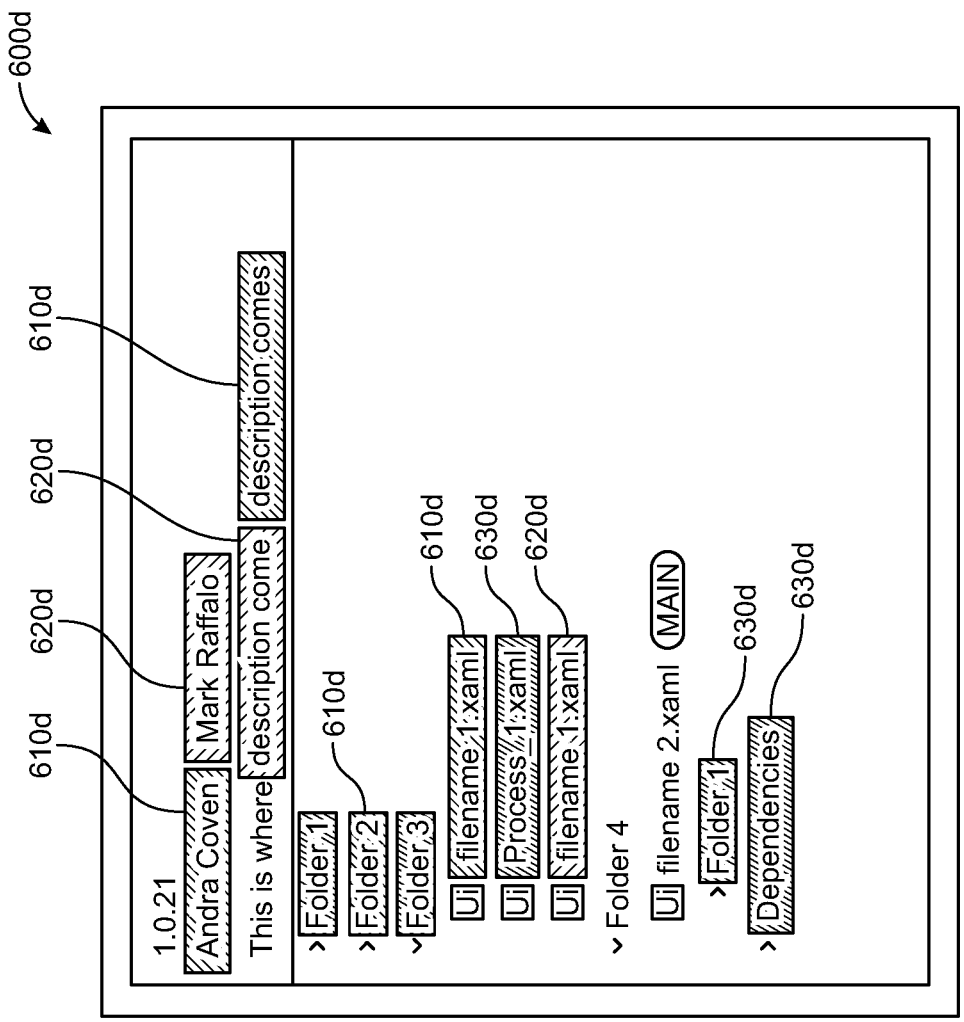

In some embodiments, the web based user interface provides a visual representation of differences between any two selected packages or workflows as shown in FIG. 6D. FIG. 6D illustrates a web based user interface 600d, which provides a visual representation of changes or differences in a package version 1.0.21 as compared to a previous version. Web based user interface 600d also provides the visual representation for contents of the RPA package version 1.0.21, wherein the contents show dependencies, file items and package description. Additionally, in some embodiments, package author information are also be displayed. Web based user interface 600d displays a summary window comprising files with highlighted colors to indicate the changes in the current RPA package version 1.0.21 with respect to a previous version.

In some embodiments, the summary window includes the files added, removed and modified, which are captured based on workflow files that were added, removed or modified. According to some embodiments, the changes in the RPA package are highlighted with different colors (e.g., a first color 610d, a second color 620d, and a third color 630d). In some other embodiments, the changes in the RPA package are highlighted with different patterns. For instance, the newly added files of the RPA package are highlighted with a first color (e.g., green) or pattern 610d, the deleted files are highlighted with a second color (e.g., red) or pattern 620d and the modified files of the RPA package are highlighted with a third color (e.g., yellow) or pattern 630d.

Figure 6E:
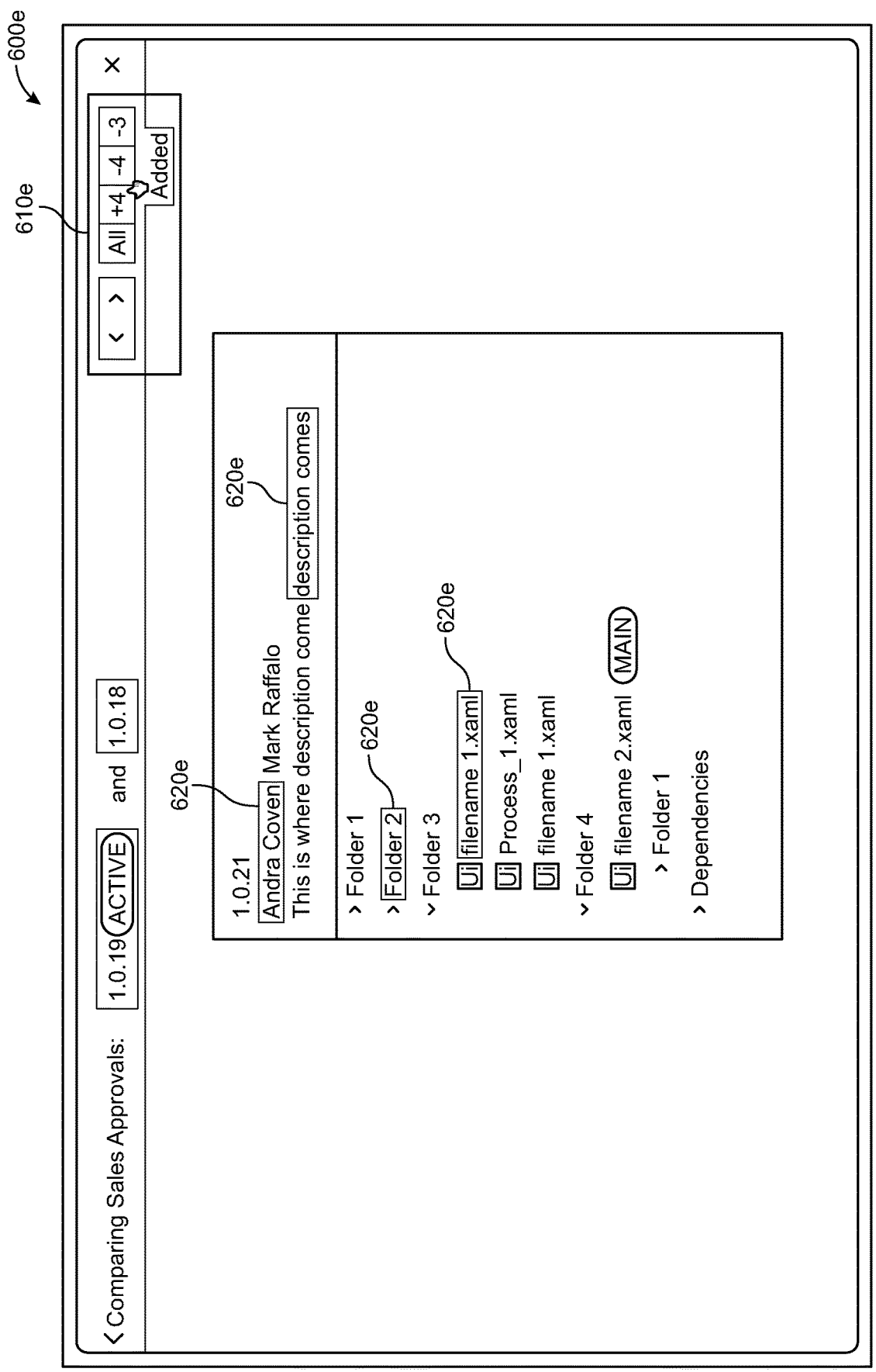

In some embodiments, the summary window on user interface 600d also includes a filter and highlights list of only files added/removed or modified based on user selection. For instance, when the user wants to see only deleted files, then this filter may highlight only the deleted files in the package. FIG. 6E illustrates the functionality of web based user interface 600e, in which a user can select one or more type of changes in the selected RPA package or the selected RPA workflow based on a filter menu 610e. Filter menu 610e displays 4 additions, 4 modifications and 3 deletions in the RPA package version 1.0.21. By clicking on any type of menu option only that type of change may be displayed on the summary window providing a visualization of differences in the selected RPA package version as compared to a previous version. For example, by clicking on +4, additions are shown by an associated color/pattern 620e (e.g., green color) at 4 places on web based user interface 600e.

The web based user interfaces disclosed with various functionalities in FIGS. 6A-6E also provide capability for viewing an RPA workflow as disclosed previously.

Figure 7:
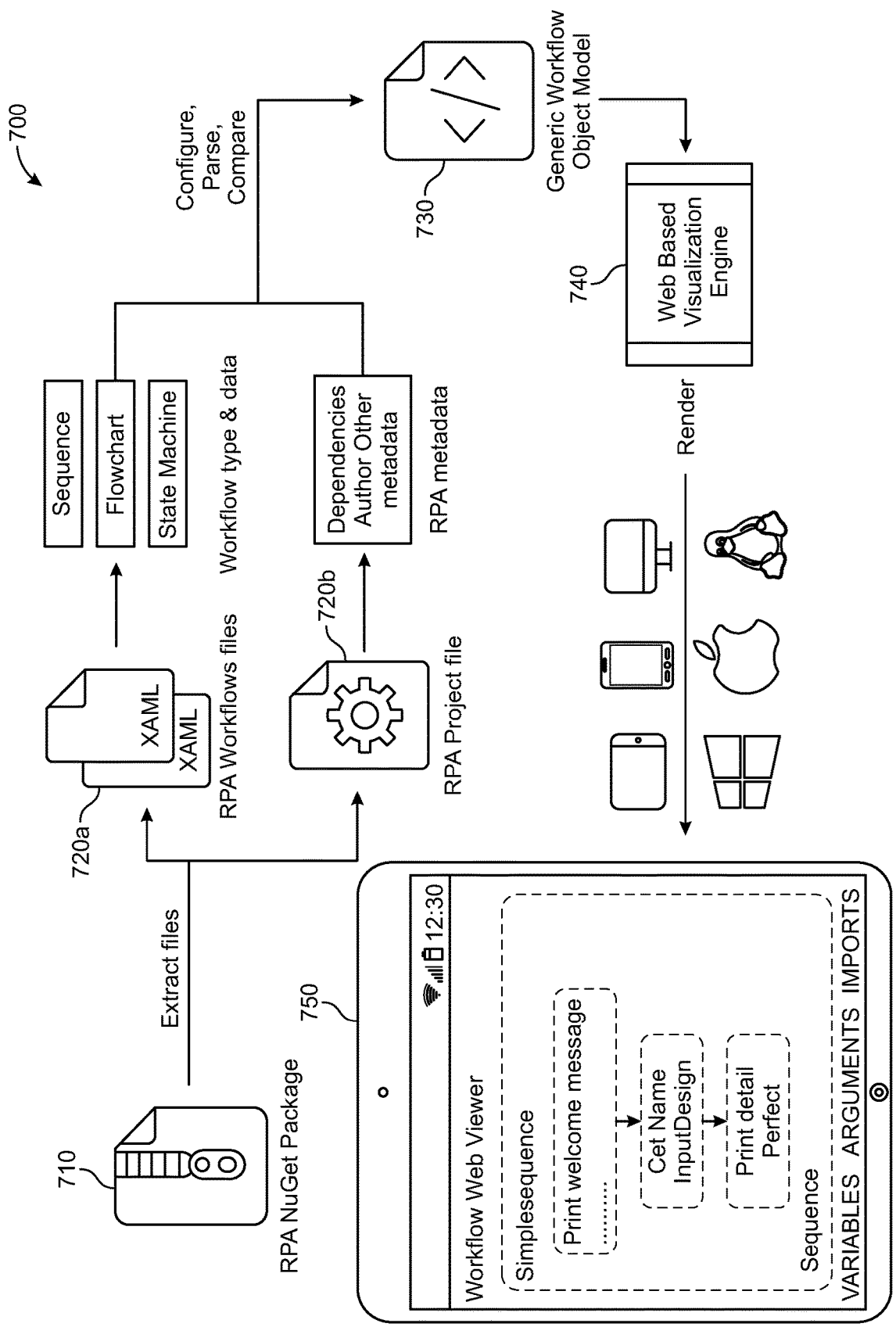
FIG. 7 is a block diagram illustrating a method for viewing an RPA workflow on the web based user interface, according to an embodiment of the present invention.

FIG. 7 illustrates a block diagram 700 illustrating a web based user interface 700 for viewing and comparing RPA workflows, according to an embodiment of the present invention. Web based user interface 700 provides a functionality to view, explore, navigate through and compare the contents of one or more RPA workflows. Web based user interface 700 also enables consuming an RPA package and extracting contents of the RPA package, including necessary metadata or files out of it for further processing. For example, web based user 700 extracts contents of an RPA package 710. The extracted contents include workflow related content 720a (also interchangeably referred to as RPA workflow) and project related content 720b. Workflow related content 720a includes one or more RPA workflow files, which are .xaml files that may be of any predefined workflow type, including but not limited to, sequences, flowcharts and state machines. Project related content 720b may include an RPA project file and RPA metadata, such as data associated with package dependencies, author and the like. Web based user interface 700 provides extraction of contents of RPA package 710. Additionally, web based user interface 700 provides for reading the RPA workflow file, that is, the .xaml file, in the workflow related content 720a, converting it into a custom data model that represents the activities and relationship between different workflow elements in the .xaml file, and use the custom data model to layout the structure of the RPA workflow in the form of an interactive hierarchical graph on the web based user interface 700. For doing this, a workflow object model component 730 and a web based visualization engine component 740 is provided.

Workflow object model component 730 generates a workflow diagram for at least one selected RPA workflow. For example, workflow object model component 730 generates a workflow diagram associated with the .xaml file included in RPA workflow related content 720a. For this, the .xaml file is parsed and analyzed to identify a plurality of workflow elements included in the .xaml file. For example, these workflow elements may include a plurality of activities and their relationships. Further, relationships between different workflow activities may be used to generate a custom data model associated with the .xaml file, which is further used to generate the workflow diagram associated with the .xaml file. The workflow diagram is an interactive hierarchical graph which represents the plurality of workflow elements, activities and relationships in the custom data model associated with the .xaml file, on web based user interface 700.

The workflow diagram is rendered on web based user interface 700 using web based visualization engine component 740. Visualization engine component 740 renders the generated workflow diagram on a display associated with web based user interface 700. For example, display unit 550 of computing system 500 may be used to view the rendered workflow diagram in some embodiments. As already discussed, computing system 500 may be any computing system known in the art, such as a laptop, a desktop, a mobile phone, a tablet, a smartphone and the like. For example, web based user interface 700 is used to render the generated visualization of the workflow diagram associated with RPA workflow 720a on a display of a mobile device 750. Thus, web based user interface 700 is used for viewing, comparing and navigating through the visual representation of one or more RPA workflows or RPA packages without needing to access a dedicated RPA development environment or IDE, but directly from a browser. This is possible due to the one or more functionalities provided by workflow object model component 730 and workflow web based visualization engine 740 component. In some embodiments, workflow object model component 730 and workflow web based visualization engine 740 component are embodied as a part of a viewing module 534 of computing system 500. In some embodiments, workflow object model component 730 and workflow web based visualization engine 740 component are embodied as part of other functional modules 536. Further, in some embodiments workflow object model component 730 and workflow web based visualization engine 740 component are embodied in the form of a separate processing module, such as in the form of a lightweight application, as a browser plug-in, as a web portal and the like, that may be used to access web based user interface 700.

In some examples, web based user interface 700 includes additional module such as a parser module to read and parse a workflow file or a, xaml file into a data model. Web based user interface 700 also includes an xml reader, which reads an xml text and converts it into an xml object model. Web based user interface 700 also includes one or more predefined models which represent the internal domain model and classes that can be exchanged among the different blocks or components of web based user interface 700. In some embodiments, web based user interfaces 700 accesses a set of predefined and pre-existing APIs from an API library that include a plurality of functions, algorithms and code bundles that are used to implement web based user interface 700. The preexisting set of APIs are created when a user installs the application for web based user interface 700 or accesses a web portal for web based user interface 700 for the first time on their system, such as on computing system 500. At that first access, a new instance of web based user interface 700 is created, and then the same instance is used to view, compare and explore as many workflows and packages as the user may desire. In some embodiments, web based user interface 700 is implemented using any web based or JavaScript based application.

As illustrated in FIG. 7, web based user interface 700 includes workflows, which are .xaml files 720*a* (also referred to as RPA workflow files), a data model, such as 730, and a web viewer interface, such as 740. In some embodiment, the .xaml file is a format for software code of the RPA workflow file. Computing system 500 converts the RPA workflow file into its own data model using the parser module. In an embodiment, the parser module breaks the data into small elements. It takes the input in form of instructions or code and builds a data structure or data model, such as the data model obtained by parsing the .xaml file, in form of a tree or a flow chart. Computing system 500 converts the data model into structural display for viewing on web viewer interface 700 using a visualizer module (web based visualization engine component 740). The structural display on the web viewer interface makes the visual representation using flow charts or graphs and makes understanding easy for the user, in the form of a workflow diagram.

Figure 8A:
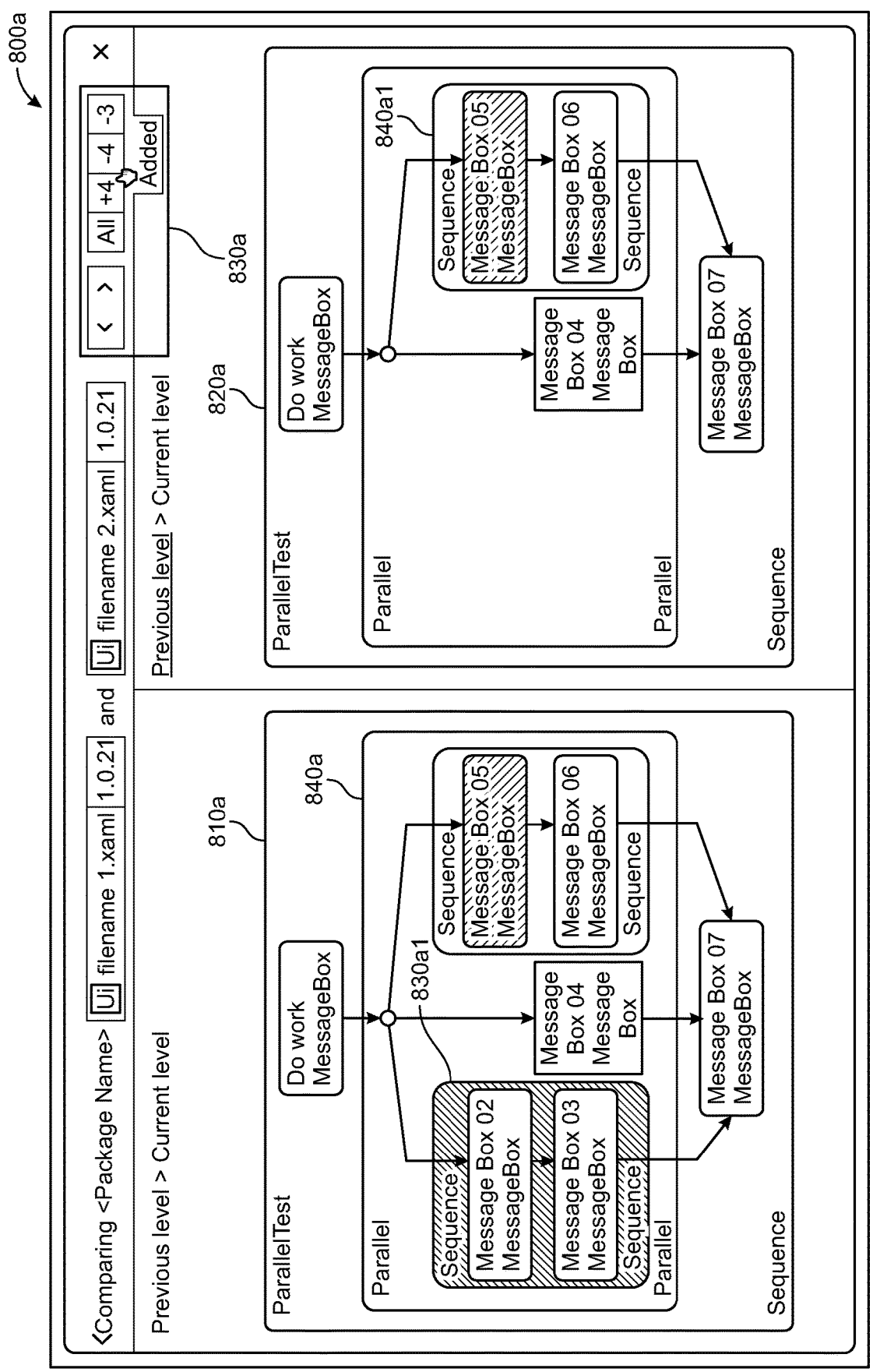
FIGS. 8A and 8B are GUIs illustrating web based user interfaces for visual representation of comparison of RPA workflows, according to an embodiment of the present invention.
Figure 8B:
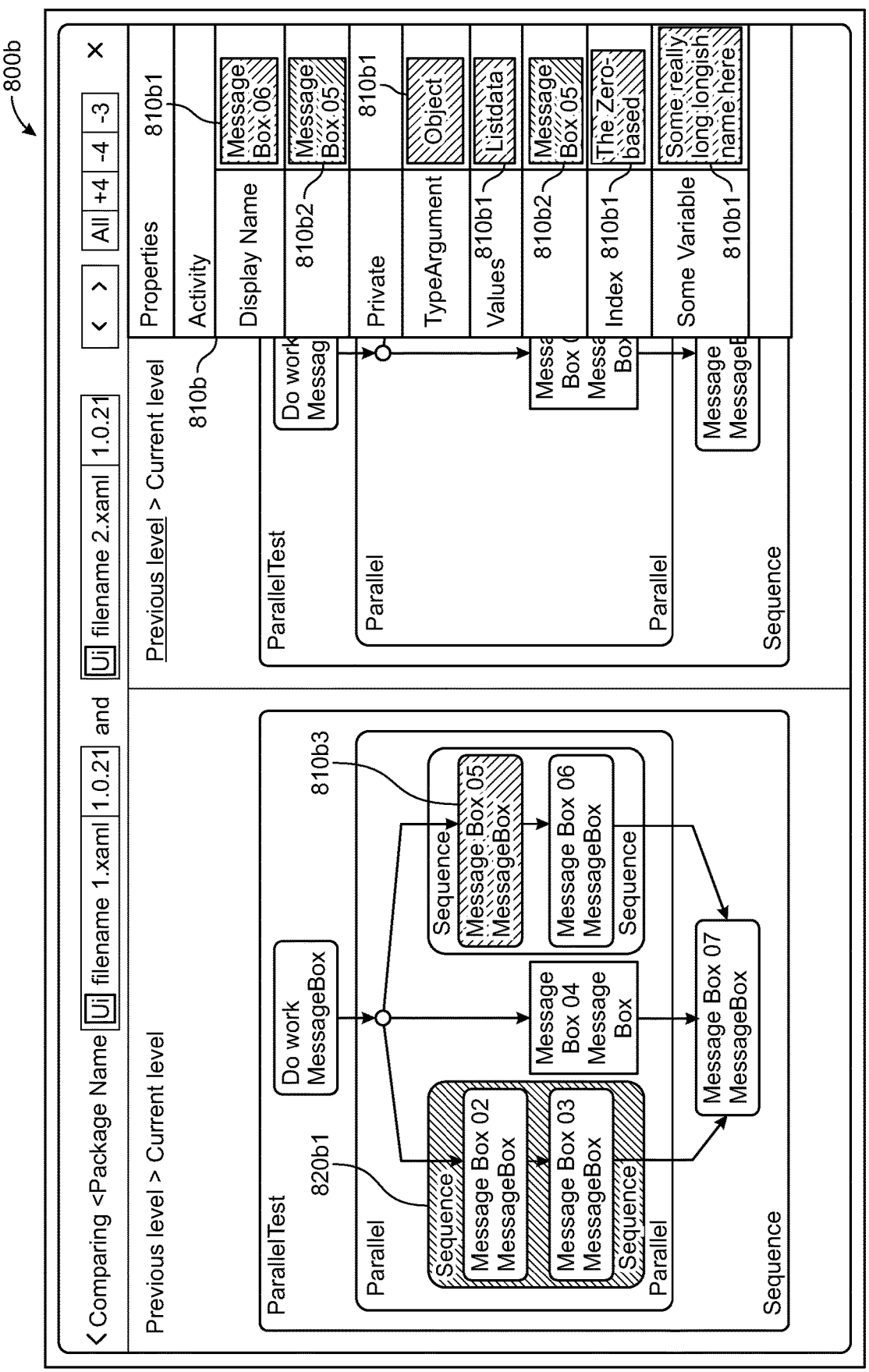

FIGS. 8A-8B illustrate exemplary user interfaces for visual representation for comparison of RPA workflows, according to an embodiment of the present invention. Computing system 500 is configured to allow the user to view list of RPA package versions (for instance version 1.0, version 1.1 . . . version 1.20) on a web based user interface 800*a*. In this embodiment, the user selects at least two RPA workflow files (e.g., filename1.xaml and filename2.xaml) from the list of the RPA package versions. For instance, the user selects at least two RPA workflow files from a single RPA package. In another example, the user selects at least two RPA workflow files from two different RPA package versions. In either example, after selecting the two RPA workflow files, the user selects the "compare" button (not shown) on web based user interface 800*a* to visualize the differences between the selected RPA workflow files in a side by side manner.

Computing system 500 may provide the two RPA workflow files in the form of workflow diagrams 810*a* and 820*a*, comprising flow charts on web based user interface 800*a*. In some embodiments, these two RPA workflow flowcharts are the input to computing system 500. Computing system 500 then executes viewing module 534 to identify differences between the two RPA workflows.

Computing system 500 also calculates the differences between two RPA workflows. The differences between the two similar items in two RPA workflows may be one or more of unmodified, or modified, or added, or deleted. Each item or activity in the workflow is identified uniquely to determine if the item has been added or deleted or modified based on a unique ID assigned to each item. For instance, computing system 500 displays the status of differences between the two RPA workflows as added if any item with ID is added in new version of RPA workflow. Similarly, computing system 500 displays the status of differences between the two RPA workflows as modified if some properties are updated or added or deleted for an existing ID. For example, a menu 830*a* on web based user interface 800*a* displays the different types of differences between workflow diagrams 810*a* and 820*a*. Further, web based user interface 800*a* shows the differences between two RPA workflows represented by workflow diagrams 810*a* and 820*a* in a side-by-side manner and different colors and/or different patterns, 830*a* and 840*a*, and at a specified place for a specific difference may be used. For instance, the deleted item of the RPA package are highlighted with a first color (e.g., red) 830*a*1 and are displayed on left side. Similarly, the added item of the RPA package are highlighted and are displayed on right. Similarly, if some item is modified, the modified item may be highlighted with second color (e.g., yellow color) 840*a*1 and on both sides.

However, in some embodiments, a summary of such differences is provided on the web based user interface in the form of a summary window.

FIG. 8B depicts a visual representation of differences between two RPA workflows or a summary of changes made in at least one selected RPA workflow, as shown on a web based user interface 800*b* in the form of a summary window 810*b*. For instance, in FIG. 8B, computing system 500 displays the differences between the two RPA flowcharts highlighted with different colors (e.g., a first color 810*b*1 and a second color 810*b*2). Based on the difference calculated between the two RPA workflows, computing system 500 shows the property or configurations that contribute to the difference between the two RPA workflows. See, for example, web based user interface 800*b*. In this example, a first color (e.g., red) 810*b*1 is used to show deletions, a second color (e.g., green) 810*b*2 is used to show added properties and a third color (yellow) 810*b*3 is used to show modified properties on the selected RPA workflow on the summary window 810. Thus, using various exemplary user interfaces depicted above, the systems and methods disclosed in the invention enable viewing, exploring, analyzing, and comparing or a combination thereof different RPA packages and workflows. Various methods elaborating the specific details of the steps and algorithms used for these are discussed in the following figures (FIG. 9-FIG. 12).

Figure 9:
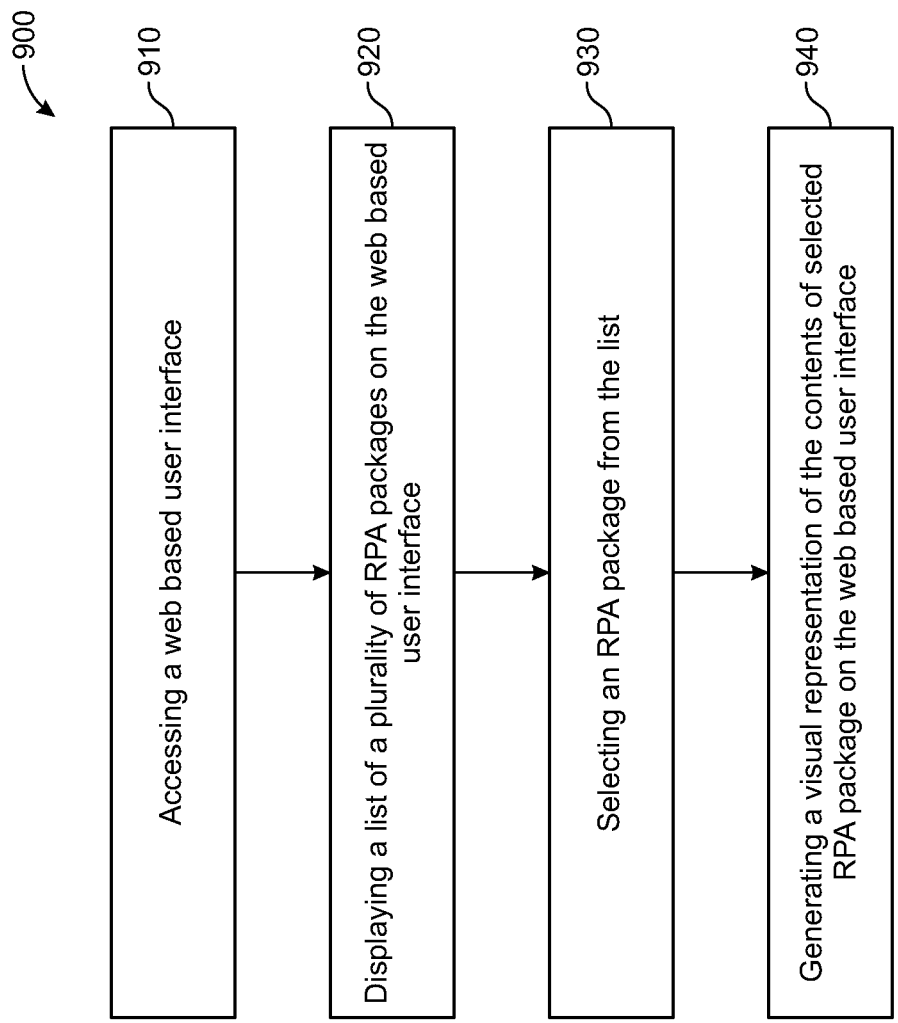
FIG. 9 is a flowchart illustrating a process for viewing an RPA package using a web based user interface, according to an embodiment of the present invention.

FIG. 9 is a flowchart illustrating a method 900 for exploring an RPA package, according to an embodiment of the present invention.

Method 900 includes, at step 910, accessing a web based user interface, such as the web based user interface 700. In some embodiments, web based user interface 700 is accessed by logging into a web portal. In some embodiments, a client instance of web based user interface 700 is installed on a computing system of a user and is invoked by accessing the web portal or by accessing a browser based plug-in. On invoking of the client instance of web based user interface 700, the client instance is initialized. The initialization of the client instance of web based user interface 700 includes initializing a parser module, such as included in workflow object model component 730, initializing a web based registry service, initializing web based visualization engine component 740 and doing all its internal set up and finally returning a fully initialized client instance of web based user interface 700 to the user.

Further, method 900 includes, at step 920, displaying a list of a plurality of RPA packages on web based user interface 700. The list of plurality of RPA packages includes a version number field associated with each RPA package from the list of plurality of RPA packages. For example, as shown in web based user interface 600b, one or more RPA packages 610b form the list of plurality of RPA packages and each RPA package is shown by their version number, such as version 1.0, version 1.1 and the like. Thus, each RPA package in the list of RPA packages is associated with a unique identifier (ID) and each ID comprises a package name and the version number field.

Method 900 further includes, at step 930, selecting, from the displayed list of RPA packages, at least one RPA package. For example, as shown in web based user interface 600d, the user has selected the at least one RPA package with version number 1.0.21. In some embodiments, the user selects at least two RPA packages that have different associated version number fields. The user may select these at least two RPA packages for comparison from the list of RPA packages. The method 900 then includes, at step 940, generating, on web based user interface 700, a visual representation for contents of the at least one RPA package for exploring the RPA package. The visual representation of the contents of the at least one RPA package comprises at least one of package dependencies, file items, package author, and package description related information. For example, web based user interface 600d shows the various folders and dependencies included in the selected package version 1.0.21. Web based user interface 600d also shows plurality of RPA workflows (such as filename_1.xaml and process_1.xaml) included within a folder 3 of the package version 1.0.21. The user can also select one or more of these RPA workflows and view or compare them on web based user interface 600d. The one or more workflows are viewed by using a workflow diagram which represents a hierarchical interactive graph that enables viewing and navigating through an RPA workflow. For example, web based user interface 800a shows workflow diagrams 810a and 820a which provide visual representation of contents of two RPA workflows filename_1.xaml and filename_2.xaml.

In some embodiments, method 900 also provides support for comparing, the selected at least two RPA packages by generating a visual representation of one or more differences between the selected at least two RPA packages. However, the details of the comparison process are illustrated in the method exemplarily illustrated in FIG. 10.

Figure 10:
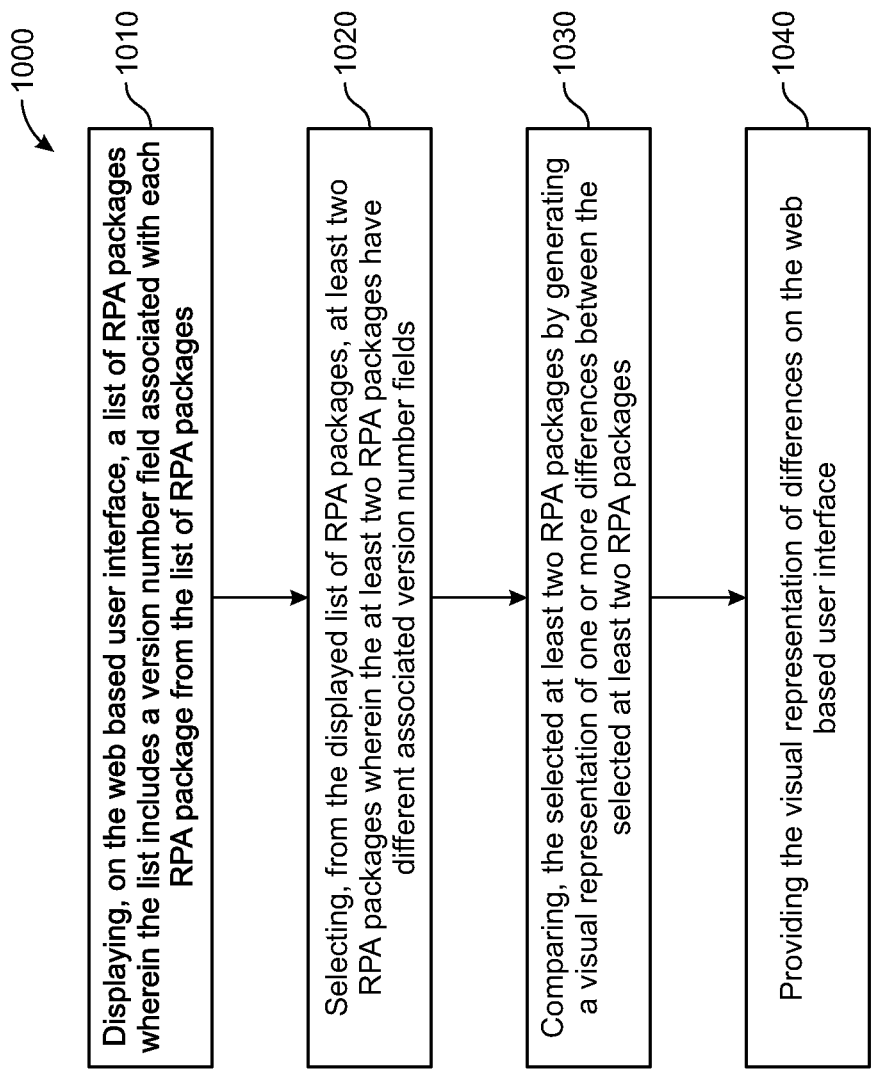
FIG. 10 is a flowchart illustrating a process for comparing at least two RPA packages using a web based user interface, according to an embodiment of the present invention.

FIG. 10 is a flowchart illustrating a process or a method 1000 for comparing at least two RPA packages using a web based user interface, according to an embodiment of the present invention.

Method 1000 includes, at step 1010, displaying on web based user interface 700, a list of a plurality of RPA packages wherein the list includes a version number field associated with each RPA package from the list of plurality of RPA packages. Further, method 1000 includes, at step 1020, selecting from the displayed list of plurality of RPA packages, at least two RPA packages, such that the selected at least two RPA packages have different associated version number fields. For example, in exemplary web based user interface 600b, the user selects two RPA packages, package version 1.0 and package version 1.1 from the displayed list of plurality of/one or more RPA packages 610b. These selected at least two packages are provided to package viewer 620b component, which is nothing but a client instance of web based user interface 600b, but initialized with details of the selected packages.

The method 1000 further includes, at step 1030, comparing the selected at least two RPA packages by generating a visual representation of one or more differences between the selected at least two RPA packages. For example, as shown in user interface 600c, the user clicks on compare button 620c to compare any two active packages, that is to say available, packages, such as any of the packages 1.0.21, 1.0.19, and the like. On clicking compare button, a visual representation of differences between the selected at least two RPA packages is generated.

Further, once differences between the selected at least two RPA packages (or package versions) are identified, method 1000 includes, at step 1040, providing the visual representation of differences on web based user interface 700. The generated the visual representation of differences between the at least two packages is in the form of a graph or a flow chart and the visual representation of differences between the at least two packages further comprises one or more color highlighters or one or more patterns to represent the differences. In some embodiments, the differences are represented in the form of a difference summary on a display, wherein the difference summary includes summary items such as additions, deletions and modifications. For example, web based user interface 600d provides a visual representation of differences between the package (with version number) 1.0.21 and one of its previous versions in the form of a difference summary where additions are represented in a first color (e.g., green) 610d, deletions are shown with a second color (e.g., red) 620d and modifications are shown with a third color (e.g., yellow) 630d. For example, in the web based user interface 600d it is shown that, filename_1.xaml is added, a previous filename_1.xaml is deleted and process_1.xaml is modified.

In some embodiments, the user is able to select any RPA workflow file included in an RPA package and view its contents on web based user interface 700.

Figure 11:
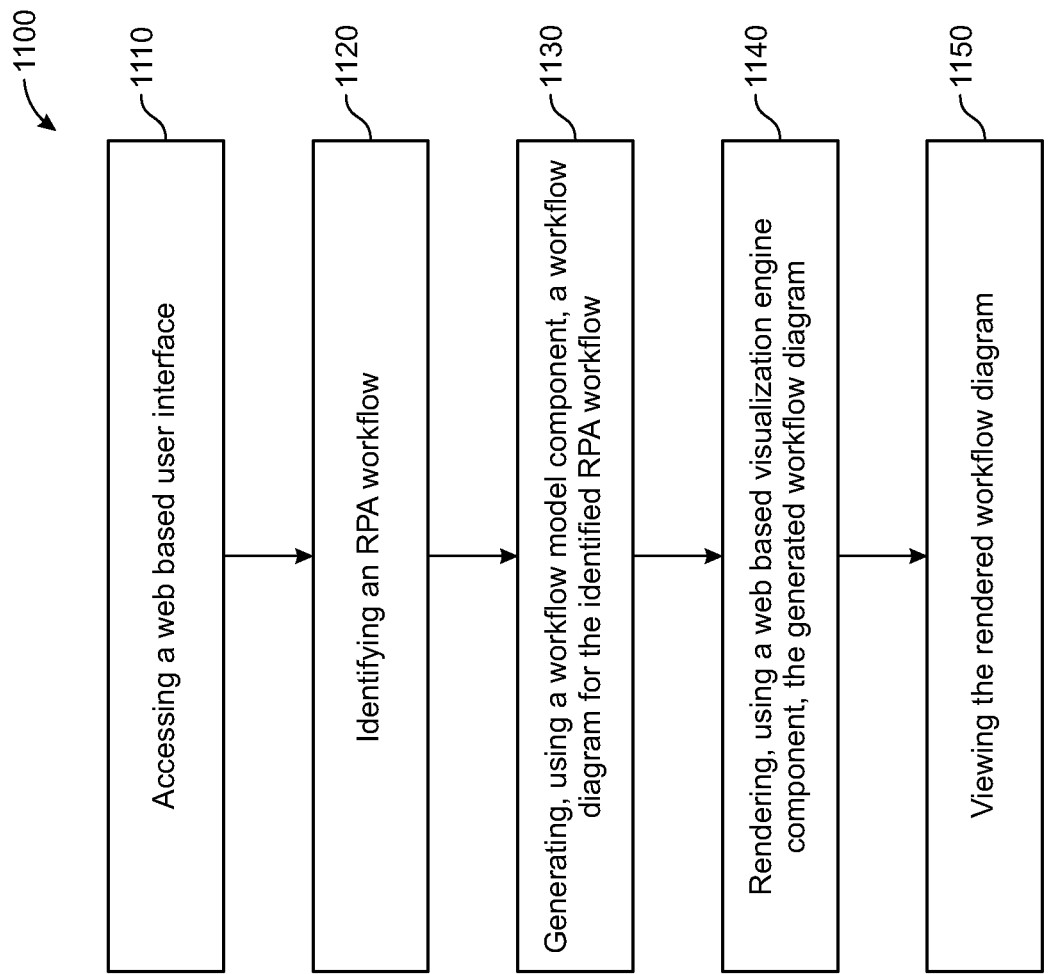
FIG. 11 is a flowchart illustrating a process for viewing an RPA workflow using a web based user interface, according to an embodiment of the present invention.

FIG. 11 is a flowchart illustrating a method 1100 for viewing an RPA workflow using a web based user interface, according to an embodiment of the present invention.

Method 1100 includes, at step 1110, accessing the web based user interface, such as web based user interface 700.

Further, method 1000 includes, at step 1120, identifying at least one RPA workflow. The at least one RPA workflow may be identified such as by selecting the at least one RPA workflow from a package version displayed on web based user interface 700. For example, web based user interface 600c shows, identifying (by selecting) the filename_1.xaml workflow from the package 1.0.21. In some embodiments, the user may select a second workflow also after selecting the at least one workflow.

Further, method 1100 includes, at step 1130, generating using a workflow object model component (e.g., workflow object model component 730), a workflow diagram, associated with the identified at least one workflow diagram. The workflow diagram provides a visual representation of the contents of the identified RPA workflow on the web based user interface. The workflow diagram is in the form of an interactive hierarchical graph in some embodiments, which enables a non-linear navigation for the contents of the workflow diagram. That is to say, the user is able to navigate from any content element to any other content element without following any specific sequential order. The contents of the workflow represented using the workflow diagram include one or more of workflows, activities and relationships. An activity has a tree-structure where scope/container activities can have other activities as children, and all those child activities have the scope/container activity set as their parent. The activity is an n-ary tree structure where the main scope/container is the root activity. The workflow represented by the workflow diagram on the other hand has a directed graph structure. When the workflow itself is considered, the flowchart and state machine workflows form cyclic directed multigraphs with the activities as nodes, connected by the connections or transitions. Sequence workflows on the other and, form acyclic directed graphs. All these workflow elements are represented in the generated workflow diagram. For example, web based user interface 800a shows two workflow diagrams 810a and 820a.

Once, the workflow diagram associated with the identified workflow is generated, method 1100 includes, at step 1140, rendering using a web based visualization engine component, such as web based visualization engine 740, the generated workflow diagram on display 550, such as the display associated with a mobile device, e.g., mobile device 750. Thus, at step 1150, method 1100 includes viewing the rendered workflow diagram.

In some embodiments, the user selects a second workflow for viewing or comparing on the display.

Figure 12:
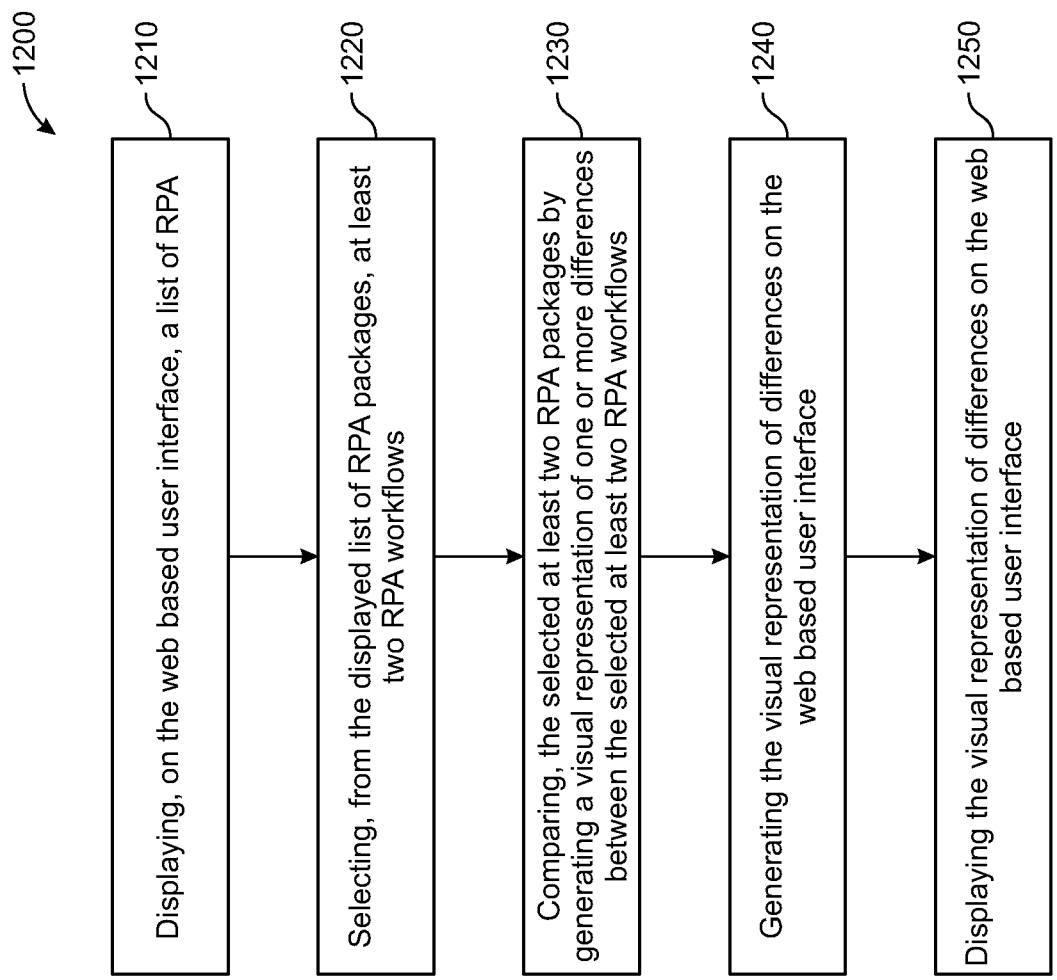
FIG. 12 is a flowchart illustrating a process for comparing at least two RPA workflows using a web based user interface, according to an embodiment of the present invention.

FIG. 12 is a flowchart illustrating a method 1200 for comparing at least two RPA workflows using a web based user interface, according to an embodiment of the present invention. Method 1200 includes, at step 1210, displaying on web based user interface 700, the list of plurality of RPA packages (e.g., one or more RPA packages 610b). Further, method 1200 includes, at step 1220, selecting from the displayed list of RPA packages, at least two RPA workflows. For example, web based user interface 800a shows two workflows filename_1.xaml and filename_2.xaml.

Method 1200 further includes, at step 1230, comparing the selected at least two workflows by generating a visual representation of differences between the selected at least two workflows. For example, the user may click on compare button 620c illustrated on web based user interface 600c for comparing the two workflows filename_1.xaml and filename 2.xaml. In some embodiments, a workflow comparison algorithm may be provided as:

Start of Algorithm
Activities
IdRef as ID
Modified if
  Any of the property value/type is changed (for property, Name is ID)
  Activity has been moved inside a new container/scope activity i.e. the Parent has changed
  A container/scope activity is NOT modified if any child is added/deleted/modified. There is an exception for State Machines, see below.
  DisplayName or Text or any other property is NOT given any special status. They all are considered properties
  For Sequence or Flowchart type of workflows, they are always shown in ExpandAll mode. So all the nested activities inside all containers/scoped are shown, and diff logic is applied on them individually
  Same rules apply when specific activity is viewed within a Workflow in Focused View Only for State Machine, the State activities are not expanded. And only for State activities in State Machine view they are considered modified, along with above rules, if
  Any of the child activities inside State has been added, deleted or modified
  This does not apply in focused view of states, where they behave as normal activities
  For workflows, which are graphical, 2-dimensional and grow both in x-axis and y-axis, have nesting, and one child can move to another parent and/or move within the parent. For such workflows defined above, provide for sync-step-through features.
  Use web based user interface to provide previous and next buttons to step-through all the changes in a workflow. While stepping through the changes, the system automatically scrolls a canvas of the display associated with the web based user interface in 2D so that an element being compared is always present in the visible area of the canvas
  If it's a small element (dimensions smaller than visible screen)
  If it's fully visible, the visible area is not moved. If it's not/partially visible, scroll X and Y axis functionality is implemented to bring it to center of screen
  If it's a larger element (dimensions larger than visible screen)
  If any part of it is visible, do not move
  If no part is visible, scroll X and Y axis so that the middle-top part becomes visible on screen
  Element being compared is always highlighted so that it's easy to spot on screen
  Also, the step-through provides filters to compare only specific type of changes (e.g. only added, deleted, modified elements OR all
  the changes)
End of Algorithm After comparison, method 1200 includes, at 1240 the visual representation of differences between the selected at least two RPA workflows on web based user interface 700. For example, user interfaces 800a and 800b represent two different ways of representing visual representation of differences between the selected at least two RPA workflows. Finally, at step 1240, this visual representation of differences is displayed on web based user interface 700 and its associated display, such as the display unit 550.

In an example embodiment, methods 900-1200 of FIGS. 9-12 above comprise configuring a computer program associated with a hardware processor configured to execute a series of operations, wherein the series of operations are used to perform all or some of the steps described in conjunction with each of methods 900-1200. The hardware processor may, for example, be configured to execute the series of operations associated with each of methods 900-1200 by performing hardware implemented logical functions, executing stored instructions, or executing algorithms for performing each of the operations. Alternatively, the apparatus comprises means for performing each of the operations described above. In this regard, according to an example embodiment, examples of means for executing the series of operations associated with each of methods 900-1200 may comprise, for example, processor 520 which is implemented in system 500 and/or a device or circuit for executing instructions or executing an algorithm for processing information as described above.

The computer program may be implemented in hardware, software, or a hybrid implementation. The computer program may be composed of modules that are in operative communication with one another, and which are designed to pass information or instructions to display. The computer program may be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for viewing at least one robotic process automation (RPA) workflow using a web based user interface, the method comprising:
   accessing, a web based user interface;
   identifying the at least one RPA workflow for viewing on the web based user interface;
   generating, using a workflow object model component, a workflow diagram for the identified at least one RPA workflow, wherein the generating the workflow diagram comprising:
      generating an interactive hierarchical graph, and
      enabling non-linear navigation within the interactive hierarchical graph for the one or more content within the generated workflow diagram;
   rendering, using a web based visualization engine component, the generated workflow diagram for the identified at least one RPA workflow; and
   displaying, on the web based user interface, the rendered generated workflow diagram for viewing of the at least one RPA workflow.

2. The computer-implemented method of claim 1, further comprising providing non-linear navigation function for navigating on the rendered generated workflow diagram.

3. The computer-implemented method of claim 1, further comprising:
   displaying, on the web based user interface, a list of a plurality of RPA packages
   selecting, from the displayed list of plurality of RPA packages, at least two RPA workflows, wherein the at least two RPA workflows are selected from same RPA package or from two different RPA packages, in the list of RPA packages;
   comparing, the selected at least two RPA workflows by generating a visual representation of differences between the selected at least two RPA workflows; and
   displaying, on the web based user interface, the visual representation of differences between the selected at least two RPA workflows.

4. The computer-implemented method of claim 3, wherein the visual representation of differences between the selected at least two workflows further comprises a specified color and a specified place to represent the differences on a display.

5. The computer-implemented method of claim 3, wherein the visual representation of differences comprises displaying a difference summary, wherein the difference summary includes summary items such as additions, deletions, and modifications.

6. The computer implemented method of claim 1, further comprising:
   displaying, on the web based user interface, a list of a plurality of RPA packages, wherein each RPA package from the list of plurality of RPA packages is associated with a version number field;
   selecting, at least one RPA package from the list of plurality of RPA packages; and
   generating, on the web based user interface, a visual representation for contents of the at least one RPA package for exploring the RPA package, wherein the visual representation of the contents of the at least one RPA package comprises at least one of package dependencies, file items, package author, and package description.

7. The computer-implemented method of claim 6, further comprising:
   selecting, from the displayed list of plurality of RPA packages, at least two RPA packages wherein the at least two RPA packages have different associated version number fields;
   comparing, the selected at least two RPA packages by generating a visual representation of one or more differences between the selected at least two RPA packages; and
   displaying, on the web based user interface, the visual representation of differences between the selected at least two RPA packages.

8. The computer-implemented method of claim 1, further comprising:
   selecting a second RPA workflow;
   generating a second workflow diagram associated with the second RPA workflow;

comparing, the at least one RPA workflow and the second RPA workflow to identify one or more workflow differences between the at least one RPA workflow and the second RPA workflow;

generating, a visual representation of the one or more workflow differences on at least one of a first workflow diagram and the second workflow diagram; and displaying, on the web based user interface, the visual representation of the one or more workflow differences.

9. A system for viewing at least one robotic process automation (RPA) workflow using a web based user interface, the system comprising:

memory, configured to store computer-executable instructions; and one or more processors configured to execute the instructions to:

accessing, the web based user interface;

identifying the at least one RPA workflow for viewing on the web based user interface;

generating, using a workflow object model component, a workflow diagram for the identified at least one RPA workflow, wherein the generating the workflow diagram comprising:

generating an interactive hierarchical graph, and enabling non-linear navigation within the interactive hierarchical graph for the one or more content within the generated workflow diagram;

rendering, using a web based visualization engine component, the generated workflow diagram for the identified at least one RPA workflow; and displaying, on the web based user interface, the rendered generated workflow diagram for viewing of the at least one RPA workflow.

10. The system of claim 9, wherein the one or more processors is further configured to execute the instructions to provide non-linear navigation function for navigating on the rendered generated workflow diagram.

11. The system of claim 9, wherein the one or more processors is further configured to execute the instructions to:

display, on the web based user interface, a list of a plurality of RPA packages select, from the displayed list of plurality of RPA packages, at least two RPA workflows, wherein the at least two RPA workflows are selected from same RPA package or from two different RPA packages, in the list of RPA packages;

compare, the selected at least two RPA workflows by generating a visual representation of differences between the selected at least two RPA workflows; and display, on the web based user interface, the visual representation of differences between the selected at least two RPA workflows.

12. The system of claim 11, wherein the visual representation of differences between the selected at least two RPA workflows further comprises a specified color and a specified place to represent the differences on a display.

13. The system of claim 11, wherein the visual representation of differences comprises displaying a difference summary, wherein the difference summary includes summary items such as additions, deletions and modifications.

14. The system of claim 9, wherein the one or more processors is further configured to execute the instructions to:

display, on the web based user interface, a list of a plurality of RPA packages, wherein each RPA package from the list of plurality of RPA packages is associated with a version number field;

select, at least one RPA package from the list of plurality of RPA packages; and generate, on the web based user interface, a visual representation for contents of the at least one RPA package for exploring the RPA package, wherein the visual representation of the contents of the at least one RPA package comprises at least one of package dependencies, file items, package author, and package description.

15. The system of claim 14, wherein the one or more processors is further configured to execute the instructions to:

select, from the displayed list of plurality of RPA packages, at least two RPA packages wherein the at least two RPA packages have different associated version number fields;

compare, the selected at least two RPA packages by generating a visual representation of one or more differences between the selected at least two RPA packages; and display, on the web based user interface, the visual representation of differences between the selected at least two RPA packages.

16. The system of claim 15, wherein to provide the visual representation of the differences between at least two RPA packages, the at least one processor is configured to generate the visual representation of differences between the at least two packages is in the form of a graphical layout; and the visual representation of differences between the at least two packages further comprises one or more color highlighters to represent the differences.

17. A computer program stored on a non-transitory computer readable medium, the computer program, when executed by one or more processors, are configured to cause the one or more processors to perform operations for viewing at least one robotic process automation (RPA) workflow using a web based user interface, the operations comprising:

accessing, the web based user interface;

identifying the at least one RPA workflow for viewing on the web based user interface;

generating, using a workflow object model component, a workflow diagram for the identified at least one RPA workflow, wherein the generating the workflow diagram comprising:

generating an interactive hierarchical graph, and enabling non-linear navigation within the interactive hierarchical graph for the one or more content within the generated workflow diagram;

rendering, using a web based visualization engine component, the generated workflow diagram for the identified at least one RPA workflow; and displaying, on the web based user interface, the rendered generated workflow diagram for viewing of the at least one RPA workflow.

18. The computer program of claim 17, wherein the operations further comprising providing non-linear navigation function for navigating on the rendered generated workflow diagram.

19. The computer program of claim 17, further comprising:

displaying, on the web based user interface, a list of a plurality of RPA packages selecting, from the displayed list of plurality of RPA packages, at least two RPA workflows, wherein the at least two RPA workflows are selected from same RPA package or from two different RPA packages, in the list of RPA packages;

comparing, the selected at least two RPA workflows by generating a visual representation of differences between the selected at least two RPA workflows; and displaying, on the web based user interface, the visual representation of differences between the selected at least two RPA workflows.

20. The computer program of claim 19, wherein the visual representation of differences between the selected at least two RPA workflows further comprises a specified color and a specified place to represent the differences on a display.

21. A computer-implemented method for viewing at least one robotic process automation (RPA) workflow using a web based user interface, the method comprising:

displaying, on the web based user interface, a list of a plurality of RPA packages selecting, from the displayed list of plurality of RPA packages, at least two RPA workflows, wherein the at least two RPA workflows are selected from same RPA package or from two different RPA packages, in the list of RPA packages;

comparing, the selected at least two RPA workflows by generating a visual representation of differences between the selected at least two RPA workflows; and displaying, on the web based user interface, the visual representation of differences between the selected at least two RPA workflows.

22. The computer-implemented method of claim 21, wherein the visual representation of differences between the selected at least two workflows further comprises a specified color and a specified place to represent the differences on a display.

23. The computer-implemented method of claim 21, wherein the visual representation of differences comprises displaying a difference summary, wherein the difference summary includes summary items such as additions, deletions, and modifications.

24. The computer-implemented method of claim 21, further comprising:

accessing, a web based user interface;

identifying the at least one RPA workflow for viewing on the web based user interface;

generating, using a workflow object model component, a workflow diagram for the identified at least one RPA workflow;

rendering, using a web based visualization engine component, the generated workflow diagram for the identified at least one RPA workflow; and displaying, on the web based user interface, the rendered generated workflow diagram for viewing of the at least one RPA workflow.

25. The computer-implemented method of claim 24, further comprising providing non-linear navigation function for navigating on the rendered generated workflow diagram.

26. The computer implemented method of claim 24, further comprising:

displaying, on the web based user interface, a list of a plurality of RPA packages, wherein each RPA package from the list of plurality of RPA packages is associated with a version number field;

selecting, at least one RPA package from the list of plurality of RPA packages; and generating, on the web based user interface, a visual representation for contents of the at least one RPA package for exploring the RPA package, wherein the visual representation of the contents of the at least one RPA package comprises at least one of package dependencies, file items, package author, and package description.

27. The computer-implemented method of claim 26, further comprising:

selecting, from the displayed list of plurality of RPA packages, at least two RPA packages wherein the at least two RPA packages have different associated version number fields;

comparing, the selected at least two RPA packages by generating a visual representation of one or more differences between the selected at least two RPA packages; and displaying, on the web based user interface, the visual representation of differences between the selected at least two RPA packages.

* * * * *